(12) United States Patent
Rogers et al.

(10) Patent No.: US 7,663,635 B2
(45) Date of Patent: Feb. 16, 2010

(54) MULTIPLE VIDEO PROCESSOR UNIT (VPU) MEMORY MAPPING

(75) Inventors: Philip J. Rogers, Pepperell, MA (US); Jeffrey Gongxian Cheng, Toronto (CA); Dmitry Semiannikov, Sunnyvale, CA (US); Raja Koduri, Santa Clara, CA (US)

(73) Assignee: ATI Technologies, Inc., Markham (CA)

( * ) Notice: Subject to any disclaimer, the term of this patent is extended or adjusted under 35 U.S.C. 154(b) by 449 days.

(21) Appl. No.: 11/139,917

(22) Filed: May 27, 2005

(65) Prior Publication Data

US 2006/0267990 A1    Nov. 30, 2006

(51) Int. Cl.
*G06F 12/10* (2006.01)
*G06F 15/16* (2006.01)
(52) U.S. Cl. ........................ 345/568; 345/502
(58) Field of Classification Search ........... 345/502, 345/541, 568, 503, 505, 564, 566
See application file for complete search history.

(56) References Cited

U.S. PATENT DOCUMENTS

| | | | |
|---|---|---|---|
| 5,361,370 A | 11/1994 | Sprague et al. | |
| 5,392,385 A | 2/1995 | Evangelisti et al. | |
| 5,428,754 A | 6/1995 | Baldwin | |
| 5,459,835 A | 10/1995 | Trevett | |
| 5,539,898 A * | 7/1996 | Trevett et al. | 711/167 |
| 5,860,139 A * | 1/1999 | Martin | 711/202 |
| 6,191,800 B1 | 2/2001 | Arenburg et al. | |
| 6,212,604 B1 * | 4/2001 | Tremblay | 711/125 |
| 6,243,107 B1 | 6/2001 | Valtin | |
| 6,359,624 B1 | 3/2002 | Kunimatsu | |
| 6,377,266 B1 | 4/2002 | Baldwin | |
| 6,476,816 B1 | 11/2002 | Deming | |
| 6,518,971 B1 | 2/2003 | Pesto, Jr. | |
| 6,535,216 B1 | 3/2003 | Deming | |
| 6,642,928 B1 | 11/2003 | Deming | |
| 6,667,744 B2 | 12/2003 | Buckelew | |
| 6,677,952 B1 | 1/2004 | Baldwin | |

(Continued)

FOREIGN PATENT DOCUMENTS

EP    0 712 076    5/1996

(Continued)

OTHER PUBLICATIONS

Humphreys, et al., "Chromium: A Stream-Processing Framework for Interactive Rendering on Clusters", ACM Transactions on Graphics ACM USA, vol. 21, No. 3, Jul. 2002, pp. 693-702.

(Continued)

*Primary Examiner*—Ryan R Yang
(74) *Attorney, Agent, or Firm*—Courtney Staniford & Gregory LLP

(57) ABSTRACT

A system and method for memory mapping in a multiple video processor (multi VPU) system is described. In various embodiments, rendering tasks are shared among multiple VPUs in parallel to provide improved performance and capability with minimal increased cost. In various embodiments, multiple VPUs in a system access each other's local memories to facilitate cooperative video processing. In one embodiment, each VPU in the system has the local memories of each other VPU mapped to its own graphics aperture relocation table (GART) table to facilitate access via a virtual addressing scheme. Each VPU uses the same virtual addresses for this mapping to other VPU local memories. This allows the driver to send exactly the same write commands to each VPU, including the numeric value of the destination address for operations such as writing rendered data. Thus, unique addresses need not be generated for each VPU.

33 Claims, 19 Drawing Sheets

U.S. PATENT DOCUMENTS

| | | | |
|---|---|---|---|
| 6,720,975 | B1 | 4/2004 | Dietrich, Jr. |
| 6,741,258 | B1* | 5/2004 | Peck et al. .................. 345/568 |
| 6,816,561 | B1 | 11/2004 | Potter |
| 6,885,376 | B2 | 4/2005 | Tang-Petersen |
| 6,956,579 | B1 | 10/2005 | Diard et al. |
| 7,075,541 | B2 | 7/2006 | Diard |
| 2002/0145609 | A1* | 10/2002 | Emmot et al. ............... 345/502 |
| 2003/0210248 | A1* | 11/2003 | Wyatt .......................... 345/541 |
| 2004/0210788 | A1 | 10/2004 | Williams et al. |
| 2005/0012749 | A1 | 1/2005 | Gonzalez et al. |
| 2005/0041031 | A1* | 2/2005 | Diard .......................... 345/505 |

FOREIGN PATENT DOCUMENTS

| | | |
|---|---|---|
| EP | 1 347 374 A2 | 9/2003 |
| GB | 2 247 596 | 3/1992 |

OTHER PUBLICATIONS

Molnar, et al., "Pixelflow: High Speed Rendering Using IMAE Composition", Computer Graphics Proceedings., Annual Conference Series, vol. 26, No. 2, Jul. 1992, pp. 231-237.

Correa, et al, "Out-of-Core Sort-First Parallel Rendering for Cluster-Based Tiled Displays", Parallel Computing, Elsevier Publishers, Amsterdam, NL, vol. 29, No. 3, Mar. 2003, pp. 325-338.

Humphreys, et al., "WIREGL: A Scalable Graphics System for Clusters", Computer Graphics SIGGRAPH 2001, Conference Proceedings. Los Angeles, CA, Aug. 12-17, 2001, pp. 129-140.

Stoll, et al., "Lightning-2: A High-Performance Display Subsystem for PC Clusters", Computer Graphics, SIGGRAPH 2001, Conference Proceedings. Los Angeles, CA Aug. 12-17, 2001, pp. 141-148.

Nonaka, et al., "Hybrid Hardware-Accelerated Image Composition for Sort-Last Parallel Rendering on Graphics Clusters With Commodity Image Compositor", Volume Visualization and Graphics, Oct. 2004, IEEE Symposium on Austin, TX, pp. 17-24.

Eldridge, et al., "Pomergranate: A Fully Scalable Graphics Architecture", Computer Graphics. SIGGRAPH 2000 Conference Proceedings. New Orleans, LA, Jul. 23-28, pp. 443-454.

Leiserson, et al., "The Network Architecture of the Connection Machine CM-05", SPAA 92 4th Annual ACM Symposium on Parallel Algorithms and Architectures ACEM New York, NY, 1992, pp. 272-285.

Molnar, et al., "A Sorting Classification of Parallel Rendering", IEEE Computer Graphics and Applications, IEEE Service Center, New York, NY, vol. 14, No. 4, Jul. 1994, pp. 23-32.

Feng, et al., "Extending Open MP for Heterogeneous Chip Multiprocessors", Parallel Processing, 2003. Proceeedings. 2003 International Conference on Oct. 6-9, 2003, Piscataway, NJ, pp. 161-168.

Whitman, Scott, "Dynamic Load Balancing for Parallel Polygon Rendering", IEEE Computer Graphics and Applications, IEEE Service Center, New York, NY, US, vol. 14, No. 4, Jul. 1, 1994, pp. 41-48.

Yung, N.H.C. et al., "Fast and Parallel Video Encoding by Workload Balancing", Systems, Man, and Cybernetics, Oct. 11, 1998, IEEE International Conference on San Diego, CA, vol. 5, pp. 4642-4647.

Nvidia Corporation, "High Resolution Antialiasing Through Multisampling", Technical Brief, 2002, 9 Pages.

Lin, et al. "An Anti-Aliasing Method for Parallel Rendering" Computer Graphics International, 1998. pp. 228-235.

Furber S B, "VLSI RISC Architecture and Organisation", New York, Marcel Dekker, US, 1989, pp. 105-109.

\* cited by examiner

MULTIPLE VIDEO PROCESSOR UNIT (VPU) MEMORY MAPPING

CROSS-REFERENCE

This application is related to the following U.S. patent applications:

Antialiasing Method and System, U.S. application Ser. No. 11/140,156, invented by Arcot J. Preetham, Andrew S. Pomianowski, and Raja Koduri, filed concurrently herewith;

Applying Non-Homogeneous Properties to Multiple Video Processing Units (VPUs), U.S. application Ser. No. 11/140,163, invented by Timothy M. Kelley, Jonathan L. Campbell, and David A. Gotwalt, filed concurrently herewith;

Frame Synchronization in Multiple Video Processing Unit (VPU) Systems, U.S. application Ser. No. 11/140,114, invented by Raja Koduri, Timothy M. Kelley, and Dominik Behr, filed concurrently herewith;

Synchronizing Multiple Cards in Multiple Video Processing Unit (VPU) Systems, U.S. application Ser. No. 11/139,744, invented by Syed Athar Hussain, James Hunkins, and Jacques Vallieres, filed concurrently herewith;

Compositing in Multiple Video Processing Unit (VPU) Systems, U.S. application Ser. No. 11/140,165, invented by James Hunkins and Raja Koduri, filed concurrently herewith;

Dynamic Load Balancing in Multiple Video Processing Unit (VPU) Systems, U.S. application Ser. No. 11/139,893, invented by Jonathan L. Campbell and Maurice Ribble, filed concurrently herewith; and Computing Device with Flexibly Configurable Expansion Slots, and Method of Operation, U.S. application Ser. No. 11/140,040, invented by Yaoqiang (George) Xie and Roumen Saltchev, filed May 27, 2005.

Each of the foregoing applications is incorporated herein by reference in its entirety.

TECHNICAL FIELD

The invention is in the field of graphics and video processing.

BACKGROUND

Graphics and video processing hardware and software continue to become more capable, as well as more accessible, each year. Graphics and video processing circuitry is typically present on an add-on card in a computer system, but is also found on the motherboard itself. The graphics processor is responsible for creating the picture displayed by the monitor. In early text-based personal computers (PCs) this was a relatively simple task. However, the complexity of modern graphics-capable operating systems has dramatically increased the amount of information to be displayed. In fact, it is now impractical for the graphics processing to be handled by the main processor, or central processing unit (CPU) of a system. As a result, the display activity has typically been handed off to increasingly intelligent graphics cards which include specialized coprocessors referred to as graphics processing units (GPUs) or video processing units (VPUs).

In theory, very high quality complex video can be produced by computer systems with known methods. However, as in most computer systems, quality, speed and complexity are limited by cost. For example, cost increases when memory requirements and computational complexity increase. Some systems are created with much higher than normal cost limits, such as display systems for military flight simulators. These systems are often entire one-of-a-kind computer systems produced in very low numbers. However, producing high quality, complex video at acceptable speeds can quickly become prohibitively expensive for even "high-end" consumer-level systems. It is therefore an ongoing challenge to create VPUs and VPU systems that are affordable for mass production, but have ever-improved overall quality and capability.

Another challenge is to create VPUs and VPU systems that can deliver affordable, higher quality video, do not require excessive memory, operate at expected speeds, and are seamlessly compatible with existing computer systems.

INCORPORATION BY REFERENCE

All publications and patent applications mentioned in this specification are herein incorporated by reference to the same extent as if each individual publication or patent application was specifically and individually indicated to be incorporated by reference.

DETAILED DESCRIPTION

An improved system and method for video processing is described herein. Embodiments include a video processing system with at least one graphics processing unit (GPU) or video processing unit (VPU). As used herein, GPU and VPU are interchangeable terms. In various embodiments, rendering tasks are shared among multiple VPUs in parallel to provide improved performance and capability with minimal increased cost. In various embodiments, multiple VPUs in a system access each other's local memories to facilitate cooperative video processing. In one embodiment, each VPU in the system has the local memories of each other VPU mapped to its own graphics address remapping table (GART) table to facilitate access via a virtual addressing scheme. Each VPU uses the same virual addresses for this mapping to other VPU local memories. This allows the driver to send exactly the same write commands to each VPU, including the numeric value of the destination address for operations such as writing rendered data. This obviates the necessity of generating unique addressing for each VPU according to known virtual addressing schemes. Respective VPUs in the system cooperate to produce a frame to be displayed. In various embodiments, data output by different VPUs in the system is combined, or merged, or composited to produce image data displayed. In one embodiment, the system is programmable such that various modes of operation are selectable, including various compositing modes, and various modes of task sharing or load balancing between multiple VPUs.

Figure 1:
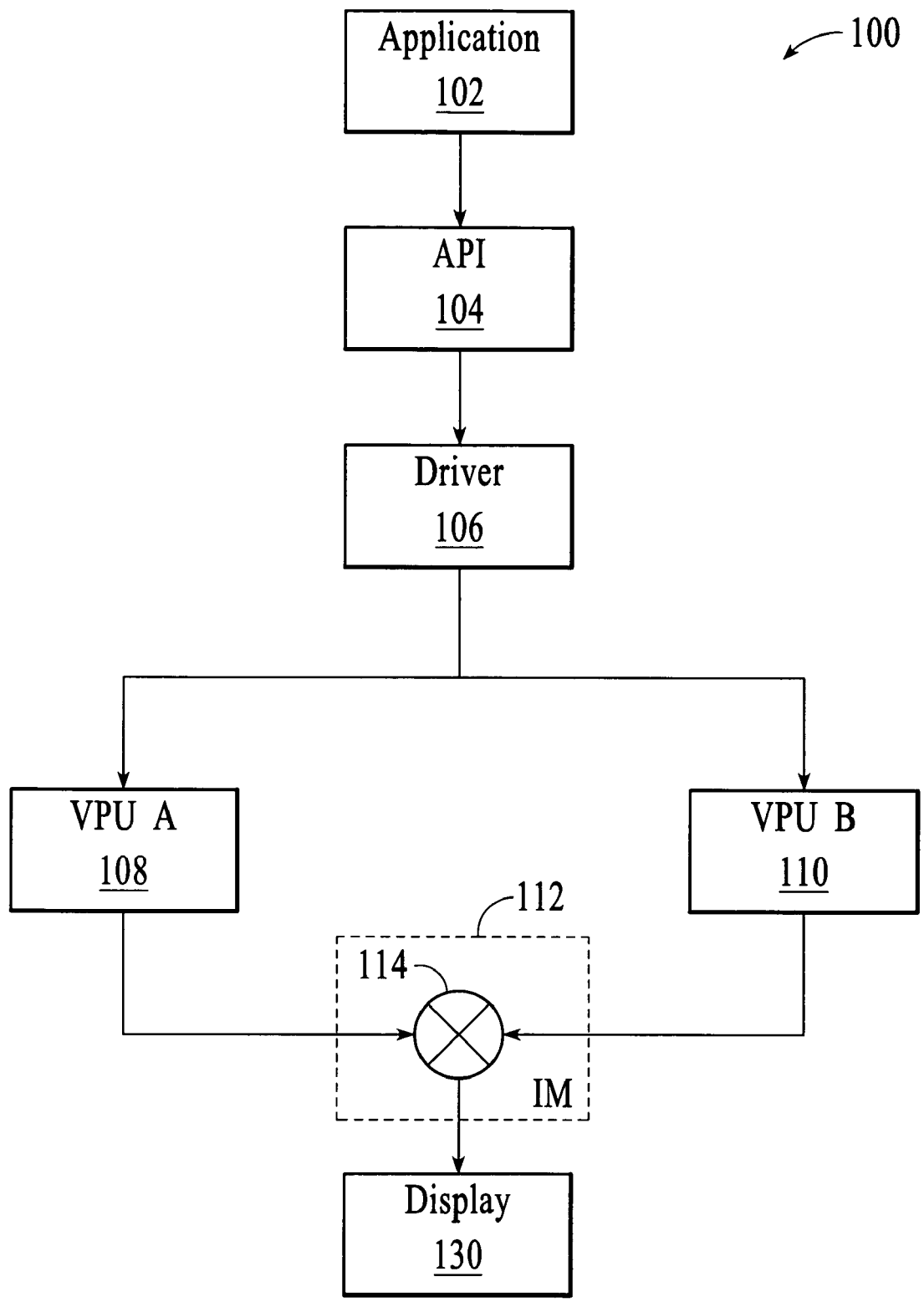
FIG. 1 is a block diagram of a video processing system according to an embodiment.

FIG. 1 is a block diagram of a video processing system 100 according to an embodiment. The system 100 includes an application 102. The application 102 is an end user application that requires video processing capability, such as a video game application. The application 102 communicates with application programming interface (API) 104. Several APIs are available for use in the video processing context. APIs were developed as intermediaries between the application software, such as the application 102, and video hardware on which the application runs. With new chipsets and even entirely new hardware technologies appearing at an increasing rate, it is difficult for applications developers to take into account, and take advantage of, the latest hardware features. It is also becoming impossible to write applications specifically for each foreseeable set of hardware. APIs prevent applications from having to be too hardware specific. The application can output graphics data and commands to the API in a standardized format, rather than directly to the hardware. Examples of available APIs include DirectX (from Microsoft) and OpenGL (from Silicon Graphics).

The API 104 can be any one of the available APIs for running video applications. The API 104 communicates with a driver 106. The driver 106 is typically written by the manufacturer of the video hardware, and translates the standard code received from the API into a native format understood by the hardware. The driver allows input from, for example, an application, process, or user to direct settings. Such settings include settings for selecting modes of operation, including modes of operation for each of multiple VPUs, and modes of compositing frame data from each of multiple VPUs, as described herein. For example, a user can select settings via a user interface (UI), including a UI supplied to the user with video processing hardware and software as described herein.

In one embodiment, the video hardware includes two video processing units, VPU A 108 and VPU B 110. In other embodiments there can be less than two or more than two VPUs. In various embodiments, VPU A 108 and VPU B 110 are identical. In various other embodiments, VPU A 108 and VPU B 110 are not identical. The various embodiments, which include different configurations of a video processing system, will be described in greater detail below.

The driver 106 issues commands to VPU A 108 and VPU B 110. The commands issued to VPU A 108 and VPU B 110 at the same time are, in one embodiment, for processing the same frame to be displayed. VPU A 108 and VPU B 110 each execute a series of commands for processing the frame. The driver 106 programmably instructs VPU A 108 and VPU B 110 to render frame data according to a variety of modes. For example, the driver 106 programmably instructs VPU A 108 and VPU B 110 to render a particular portion of the frame data. Alternatively, the driver 106 programmably instructs each of VPU A 108 and VPU B 110 to render the same portion of the frame data.

When either of VPU A 108 and VPU B 110 finishes executing the commands for the frame, the frame data is sent to a compositor 114. The compositor 114 is optionally included in an interlink module 112, as described more fully below. VPU A 108 and VPU B 110 cooperate to produce a frame to be displayed. In various embodiments, the frame data from each of VPU A 108 and VPU B 110 is combined, or merged, or composited in the compositor 114 to generate a frame to be rendered to a display 130. As used herein, the terms combine, merge, composite, mix, or interlink all refer to the same capabilities of the IM 112 and/or compositor 114 as described herein.

Figure 2:
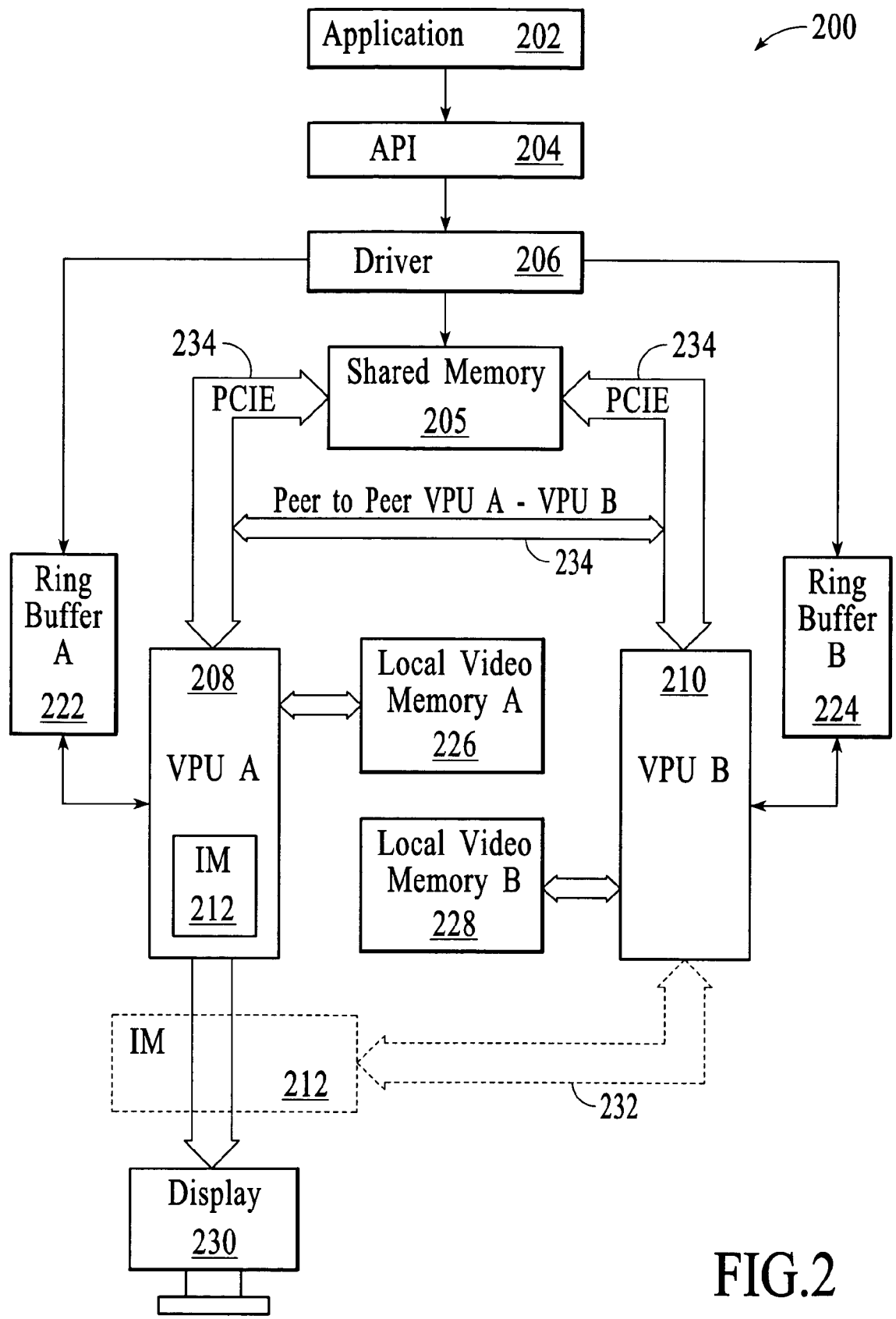
FIG. 2 is a more detailed block diagram of a video processing system according to an embodiment.

FIG. 2 is a block diagram of a system 200 according to an embodiment. The system 200 includes components or elements that may reside on various components of a video-capable computer system. In one embodiment an application 202, a driver 204, and a shared memory 205 reside on a host computer system, while remaining components reside on video-specific components, including one or more video cards, but the invention is not so limited. Any of the components shown could reside anywhere or, alternatively, various components could access other components remotely via a wired or wireless network. The application 202 is an end user application that requires video processing capability, such as a video game application. The application 202 communicates with application programming interface (API) 204. The API 204 can be any one of the available graphics, or video, or 3D APIs including DirectX (from Microsoft) and OpenGL (from Silicon Graphics).

The API 204 communicates with a driver 206. The driver 206 is written specifically for the system 200, and translates the standard code received from the API 204 into a native format understood by the VPU components, which will be explained more fully below.

In one embodiment, the system 200 further includes two VPUs, VPU A 208 and VPU B 210. The invention is not limited to two VPUs. Aspects of the invention as described herein would be workable with one VPU with modifications available to one of ordinary skill in the art. However, in most instances the system would be less efficient with one VPU than with more than one VPU. Various embodiments also include more than two VPUs. Systems with more than two are workable with modifications available to one of ordinary skill in the art, and in most instances would provide better efficiency than a system with two VPUs. In various embodiments VPU A 208 and VPU B 210 can be on one or more video cards that each includes a video processor and other associated hardware. As will be explained further below, the invention is not so limited. For example, more than one VPU can be resident on one card or board. However, as referred to herein a VPU is intended to include at least a video processor.

VPU A 208 and VPU B 210 receive commands and data from the driver 206 through respective ring buffers A 222, and B 224. The commands instruct VPU A 208 and VPU B 210 to perform a variety of operations on the data in order to ultimately produce a rendered frame for a display 230.

The driver 206 has access to a shared memory 205. In one embodiment, the shared memory 205, or system memory 205, is memory on a computer system that is accessible to other components on the computer system bus, but the invention is not so limited.

In one embodiment, the shared memory 205, VPU A 208 and VPU B 210 all have access to a shared communication bus 234, and therefore to other components on the bus 234. In one embodiment, the shared communication bus 234 is a peripheral component interface express (PCIE) bus, but the invention is not so limited.

The PCIE bus is specifically described in the following documents, which are incorporated by reference herein in their entirety:

PCI Express™, Base Specification, Revision 1.1, Mar. 28, 2005;

PCI Express™, Card Electromechanical Specification, Revision 1.1, Mar. 28, 2005;

PCI Express™, Base Specification, Revision 1.a, Apr. 15, 2003; and

PCI Express™, Card Electromechanical Specification, Revision 1.0a, Apr. 15, 2003.

The Copyright for all of the foregoing documents is owned by PCI-SIG.

In one embodiment, VPU A 208 and VPU B 210 communicate directly with each other using a peer-to-peer protocol over the bus 234, but the invention is not so limited. In other embodiments, there may be a direct dedicated communication mechanism between VPU A 208 and VPU B 210.

VPU A 208 and VPU B 210 each have a local video memory 226 and 228, respectively, available. In various embodiments, one of the VPUs functions as a master VPU and the other VPU functions as a slave VPU, but the invention is not so limited. In other embodiments, the multiple VPUs could be peers under central control of another component. In one embodiment, VPU A 208 acts as a master VPU and VPU B 210 acts as a slave VPU.

In one such embodiment, various coordinating and combining functions are performed by an interlink module (IM) 212 that is resident on a same card as VPU A 208. This is shown as IM 212 enclosed with a solid line. In such an embodiment, VPU A 208 and VPU B 210 communicate with each other via the bus 234 for transferring inter-VPU communications (e.g., command and control) and data. For example, when VPU B 210 transfers an output frame to IM 212 on VPU A 208 for compositing (as shown in FIG. 1 for example), the frame is transferred via the bus 234.

In various other embodiments, the IM 212 is not resident on a VPU card, but is an independent component with which both VPU A 208 and VPU B 210 communicate. One such embodiment includes the IM 212 in a "dongle" that is easily connected to VPU A 208 and VPU B 210. This is indicated in the figure by the IM 212 enclosed by the dashed line. In such an embodiment, VPU A 208 and VPU B 210 perform at least some communication through an IM connection 232. For example, VPU A 208 and VPU B 210 can communicate command and control information using the bus 234 and data, such as frame data, via the IM connection 232.

With reference to FIG. 1, in order to minimize the overhead for the driver, embodiments described herein allow the command buffers sent to each of the VPUs to be the same in as many respects as possible. In one embodiment, for example, the driver sends exactly the same write commands to each VPU, including the numeric value of the destination address for operations such as writing rendered data. This obviates the necessity of generating unique addressing for each VPU according to known virtual addressing schemes.

Figure 3:
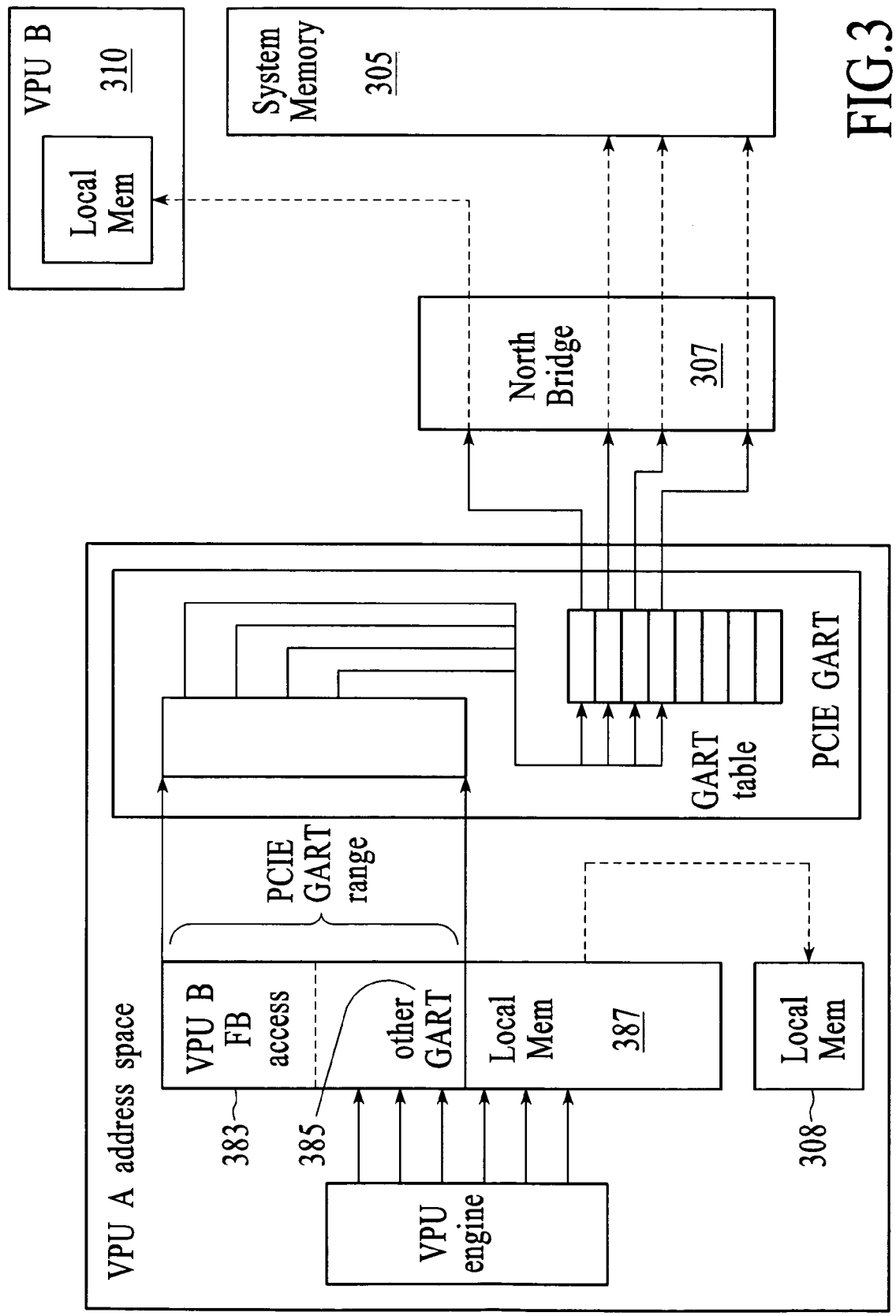
FIG. 3 is a block diagram illustrating part of a memory mapping system and method according to an embodiment.

In various embodiments, one or more of the VPUs that communicates via a PCIE bus is accessible to other PCIE bus components via a Northbridge, as known in the art. A Northbridge is the part of a chipset in a PC that controls communications among, for example, system memory, the processor, and external cache. FIG. 3 is a diagram illustrating part of a memory mapping system and method according to an embodiment. One VPU A 308 is shown connected to a system memory 305 through a Northbridge 307. A VPU A engine performs rendering, as described herein. The VPU A engine further reads and writes memory to obtain data from a source for processing and to store processed data to a destination. As previously described, two types of physical memory are available to the VPU A 308, local memory (typically located on the VPU A 308) and system memory, which is accessible via the PCIE bus. The size of local memory is limited for a variety of reasons, and therefore, the VPU A 308 uses system memory, too. In order forte VPU 308 to have access to system memory, which may be non-contiguous, in a contiguous fashion, a virtual memory scheme including a GART (graphics address remapping table) table is used, as known in the art. As shown in FIG. 3, the VPU A engine accesses a VPU A address space that includes areas for a range of GART addresses and a range of local memory addresses. An address space, as referred to herein, is a collection of addresses that refer to locations in physical memory. The VPU A address space is a collection of contiguous addresses.

When VPU A accesses to its own local memory, the VPU A engine goes directly from an address in the local memory area of the VPU A address space to the indicated address in it own physical local memory.

When the VPU A accesses system memory, there is another level of indirection. The addresses in the GART range of the VPU A address space point to locations in the GART table. The GART table, in turn, translates the addresses to addresses in a PCIE bus physical address space (not shown) in a known manner. In various embodiments, a VPU in a multiVPU system further addresses devices, other than system memory, on the PCIE bus using a special GART range area. For example, as shown in FIG. 3, a special GART range area "VPU B FB access" 383 gives VPU A access to local memory of VPU B 310 via the Northbridge and the PCIE bus. An "other GART" area 385 includes information to map a logical address to a physical address in a manner similar to the mechanism used in conventional GARTs. VPU A is thus able to use the GART table to write data, such as frame data, to another VPU. Write operations to the registers of another VPU are also enabled, as described more fully below.

As previously stated, FIG. 3 shows part of a memory mapping method according to an embodiment. Various embodiments are described with reference to FIGS. 4-8, and include each of multiple VPUs in a system configured similarly to VPU A 308 to include a special GART range area tor addressing other VPUs, for example, for sharing data to be composited or used cooperatively as described herein. In one aspect of the embodiments, the addresses in corresponding address space areas of the various system VPUs are identical, such that command buffers formed for execution by respective VPUs contain identical virtual addresses that reference different physical addresses depending upon which VPU executes the command buffer. For example, if VPU B receives address 23456 to access memory at offset X of the local memory of VPU A, then VPU A uses the same address 23456 to access memory at offset X of the local memory of VPU B.

Figure 4:
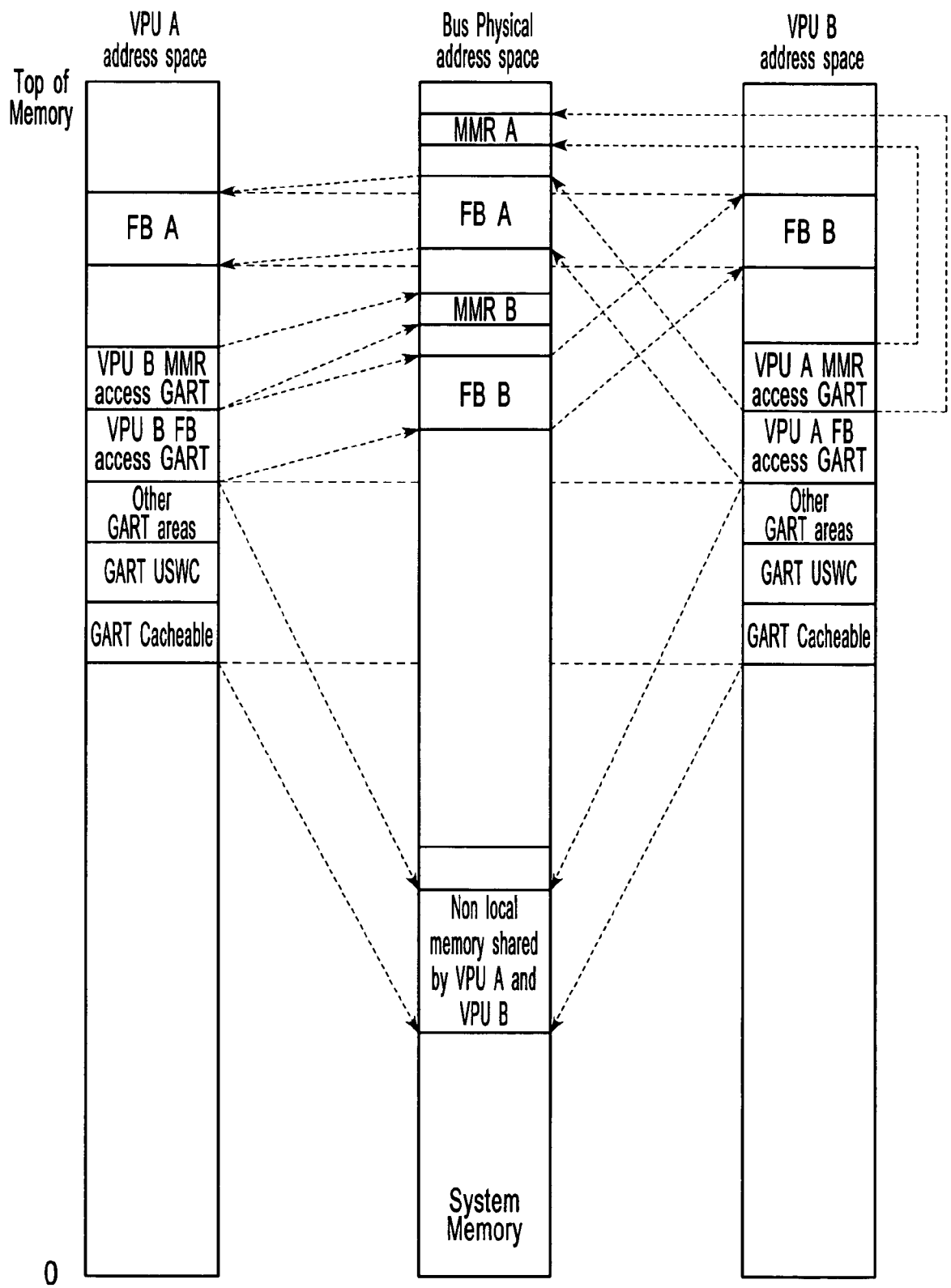
FIG. 4 is a block diagram illustrating memory mapping in a two VPU PCIE system according to an embodiment.

FIG. 4 is a diagram illustrating memory mapping in a two VPU PCIE system according to an embodiment. Three address spaces are shown: a VPU A address space on the left, a bus physical address space in the middle, and a VPU B address space on the right. The VPU A address space includes a frame buffer A (FB A) area. The FB A area contains addresses used to access the local memory of VPU A for storing a variety of data including frame data, bit maps, vertex buffers, etc. VPU B has a corresponding FB B area.

Below the FB A area in the VPU A address space is a VPU A GART area. The VPU A GART area is divided into sub-areas or ranges. For example, there is a GART cacheable area (referring to cacheable data), a GART USWC area (referring to data with certain attributes, in this case, UnSpeculated, Write, Combine), and other GART areas. The "other" GART area and the areas below it are mapped to non-local, or system, memory in a conventional manner.

In addition, the VPU A GART area includes sub-areas set aside for allowing accesses to the local memory, and registers, of VPU B. These sub-areas include a VPU B FB access area (for access to local memory), and a VPU B MMR access area (for access to memory mapped registers).

The VPU B includes a corresponding VPU B GART area.

The FB A area is accessible to other devices on the PCIE bus via the bus physical address space, or bus address space, as previously described. The FB A on the left, in the VPU A address space, is conventionally mapped to the bus address space in the middle of the diagram, as shown. This allows any device on the PCIE bus access to the local memory through the FB A portion of the VPU A address space. In addition, according to an embodiment, this FB A address range is mapped into a GART range in an address space of VPU B as shown on the right (VPU A FB access). This allows VPU B to access the FB A range through its own GART mechanism, which points to the FB A range in the bus address space as shown. Therefore if the VPU B wants to access the local memory of VPU A, it first goes through the GART range in the VPU B address space which maps to the FB A range in the bus address space. The FB A range in the bus address space, in turn, maps to the FB A range in the VPU A address space.

Similarly, the FB B area is accessible to other devices on the PCIE bus via the bus physical address space, or bus address space, as previously described. The FB B on the right, in the VPU B address space, is conventionally mapped to the bus address space in the middle of the diagram, as shown. This allows any device on the PCIE bus access to the local memory through the FB B portion of the VPU B address space. In addition, according to an embodiment, this FB B address range is mapped into a GART range in an address space of VPU A as shown on the left (VPU B FB access). This allows VPU A to access the FB B range through its own GART mechanism, which points to the FB B range in the bus address space as shown. Therefore if the VPU A wants to access the local memory of VPU B, it first goes through the GART range in the VPU A address space which maps to the FB B range in the bus address space. The FB B range in the bus address space, in turn, maps to the FB B range in the VPU B address space.

In addition to each VPU GART range having an area or range for accessing the FB of the other VPU, each VPU GART range has an area or range for the accessing memory mapped registers (MMR) of the other VPU. The VPU A GART range on the left includes "VPU B MMR access" area and the VPU B GART range on the right includes "VPU A MMR access" area. Each of these MMR GART areas point to a corresponding MMR area in the bus address range, which allows a VPU to access another's memory mapped registers via the PCIE bus.

In FIGS. 4-7, the horizontally aligned areas of different VPU address spaces represent identical contiguous address spaces. That is, horizontally aligned address spaces in each VPU are mirror images of each other, including the same numerical addresses. Therefore, the same command buffers, that is command buffers with the same or similar set of rendering commands, including identical addresses, is sent to each VPU. The physical memory being referenced by a particular address will depend on which VPU is executing the command buffer, due to the mapping scheme as described. This improves efficiency in driver design and operation.

Figure 5:
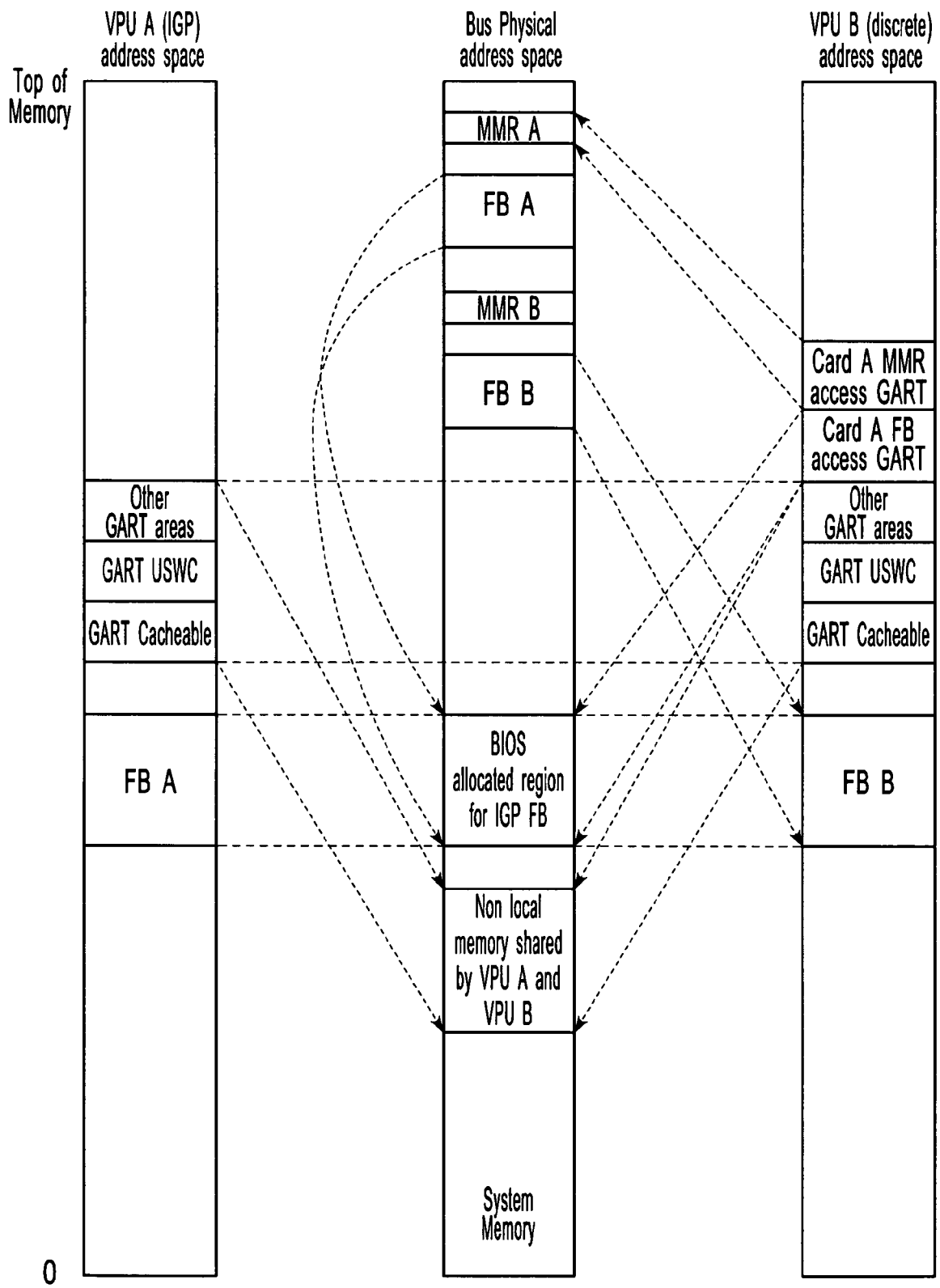
FIG. 5 is a diagram of memory mapping in which a video processing system includes an integrated graphics or video processor (IGP) and a discrete VPU according to an embodiment.

FIG. 5 is a diagram of memory mapping according to another embodiment in which a video processing system includes an integrated graphics or video processor (IGP), VPU A, and a discrete VPU B. The discrete VPU B can reside in any system or subsystem in which the discrete VPU B has access to the system bus, such as a PCIE bus. In one embodiment, the VPU A is not configured to have access to the system bus, or PCIE bus. The VPU A does not have a local, physically resident, memory. Rather, its "local memory" is in system memory, and its FB area is in a BIOS range of bus address space. In one embodiment, the IGP cannot access the FB B of the discrete VPU (VPU B) because of hardware limitations. However, VPU B can access FB A of VPU A through a "card A FB access GART" area that points to the BIOS range of the bus address space allocated for IGP FB. Similarly, VPU B can access the memory mapped registers MMR A of VPU A through a specific MMR A area in its own GART.

Figure 6:
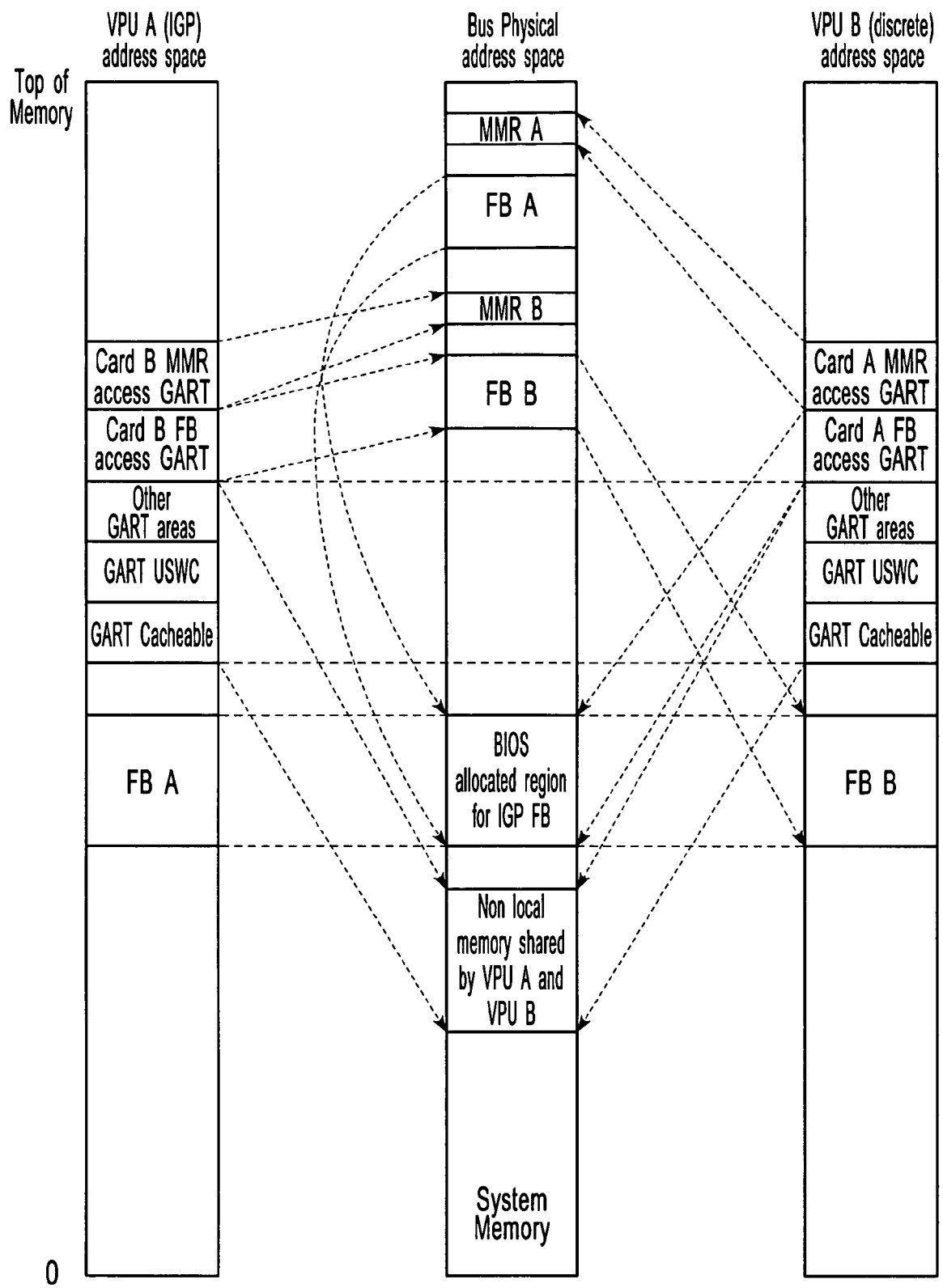
FIG. 6 is a diagram of memory mapping in which a video processing system includes an integrated graphics or video processor (IGP) and a discrete VPU according to another embodiment.

FIG. 6 is a diagram of memory mapping according to another embodiment in which a video processing system includes an integrated graphics or video processor (IGP), VPU A, and a discrete VPU B. The discrete VPU B can reside in any system or subsystem in which the discrete VPU B has access to the system bus, such as a PCIE bus. In one embodiment, the VPU A is configured to have access to the system bus, or PCIE bus. However, the VPU A does not have a local, physically resident, memory. Rather, its "local memory" is in system memory, and its FB area is in a BIOS range of bus address space. VPU B can access FB A of VPU A through it own "card A FB access GART" area that points to the BIOS range of the bus address space allocated for IGP FB. Similarly, VPU B can access the memory mapped registers MMR A of VPU A through a specific MMR A area in its own GART. In an embodiment, the IGP can similarly access the FB B of the discrete VPU (VPU B) through a "card B FB access GART" area that points to the FB B area in the bus physical address space. Also, VPU A can access the memory mapped registers MMR B of VPU B through a specific MMR B area in its own GART that points to a MMR B area in the bus physical address space.

Figure 7:
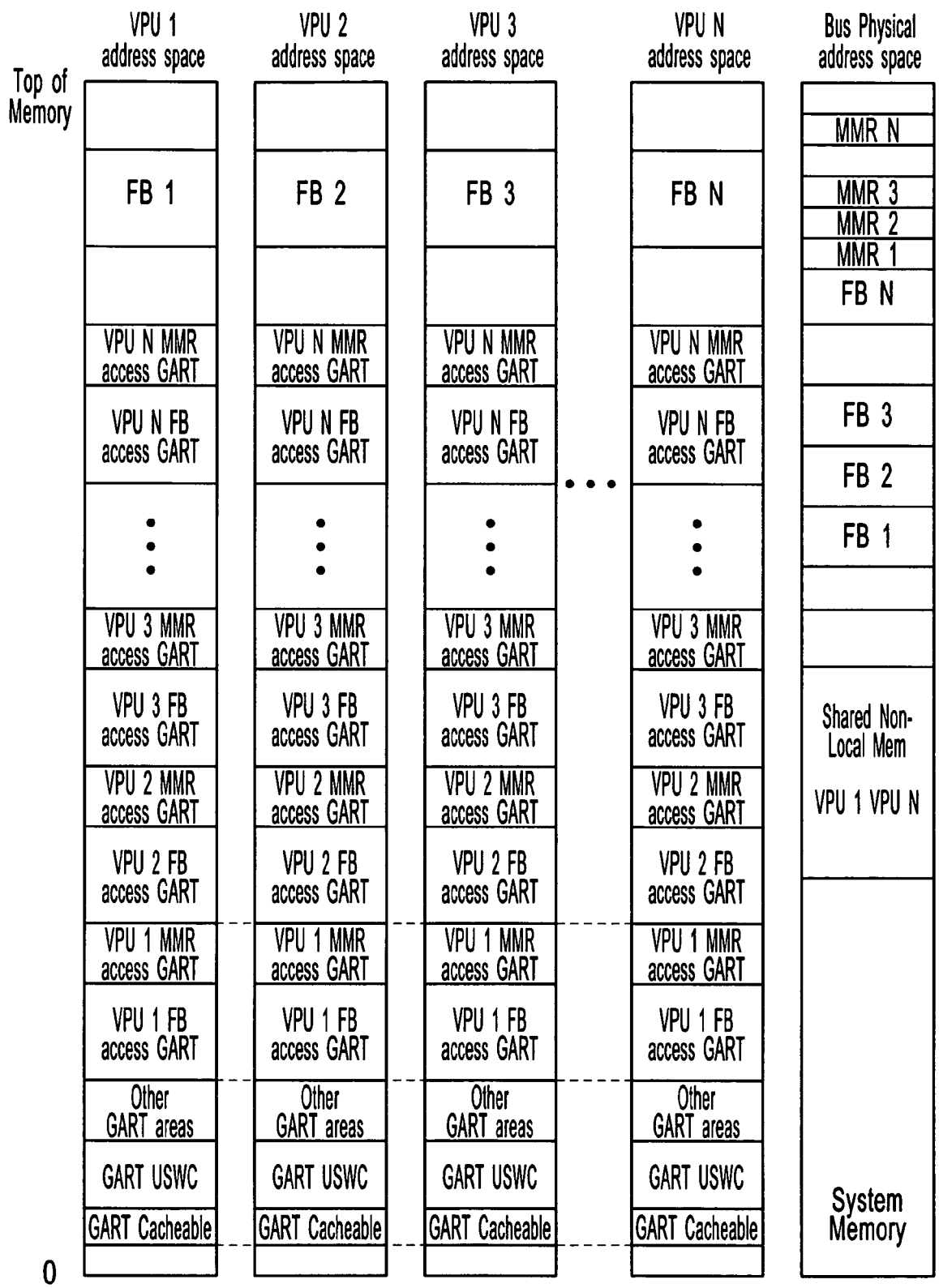
FIG. 7 is a diagram of memory mapping in an embodiment in which there are more than two VPUs according to an embodiment.

FIG. 7 is a diagram of memory mapping in an embodiment in which there are more than two VPUs. The diagram shows respective address spaces for a VPU 1, a VPU 2, a VPU 3, and so on ending with a VPU N. Each of the VPU address spaces includes a range for the VPU's own FB, shown as the top labeled area in each address space. Each of the VPU address spaces fin-they includes a "local" GART area starting with "other" GART areas and continuing to the bottom of each address space. Each of the VPU address spaces further includes ranges for access to the FB of every other VPU in the system that is not itself. The VPU 1 address space includes a range for FB 1, a range for VPU N FB access, a range for VPU 2 FB access, and a range for VPU 3 FB access. The VPU 2 address space includes a range for FB 2, a range for VPU N FB access, a range for VPU 1 FB access, and a range for VPU 3 FB access. The VPU 3 address space includes a range for VPU 3, a range for VPU N FB access, a range for VPU 1 FB access, and a range for VPU 2 FB access.

For any VPU X, there is an area of the VPU X address space reserved for the accessing the FB of VPU X (i.e., VPU X FB access GART). Since VPU X does not need to access its frame buffer (i.e., FB X) using the GART information—it does so directly—the VPU X FB access GART is not used. This "dummy" section is identified by the self-titled FB GART access areas for each VPU address space. For example, VPU 2 will access FB 2, which is in local memory, directly. Nevertheless, to ensure that the "other GART" sections of all of the VPUs line up, VPU 2 includes a portion of its address reserved for VPU 2. This portion is identified as VPU 2 FB access GART and VPU 2 MMR access GART. Since VPU 2 will access its FB and MMR directly (without any need for the mapping functionality provided by a GART), VPU 2 will not need to access VPU 2 FB access GART and VPU 2 MMR access GART.

Each of the "VPU X FB access" ranges correspond. That is, for a given VPU, the address ranges for access are aligned at the same address boundaries in each VPU address space. For example, from left to right, VPU 1 address space has a VPU N FB access range. VPU 2 address space has a VPU N FB access range aligned with that of VPU 1. VPU 3 address space has a VPU N FB access range aligned with those of VPU 1 and VPU 2. However, VPU N address space has a corresponding aligned address space that is not used.

The physical bus address space added for N VPU case of FIG. 7 functions in a similar manner as the physical bus address space described with reference to 3-6. All of the VPUs' resources (e.g., FB and registers) have their address ranges represented on the bus in order for other devices to access them. The bus address space has an address range (FB X) for each of the VPUs. It also has an address range (MMR X) for each of the VPUs. Each of these address ranges is mapped to the corresponding VPU's memory or registers in the same way as previously described, for example with reference to a two VPU system.

Other configurations of memory mapping including issuing using the same commands to each of multiple VPUs, including identical addresses or memory references, are contemplated as within the scope of the invention as claimed.

There are many configurations of the system 200 (as shown in FIG. 2) contemplated as different embodiments of the invention. FIGS. 8-13 as described below illustrate just some of these embodiments.

Figure 8:
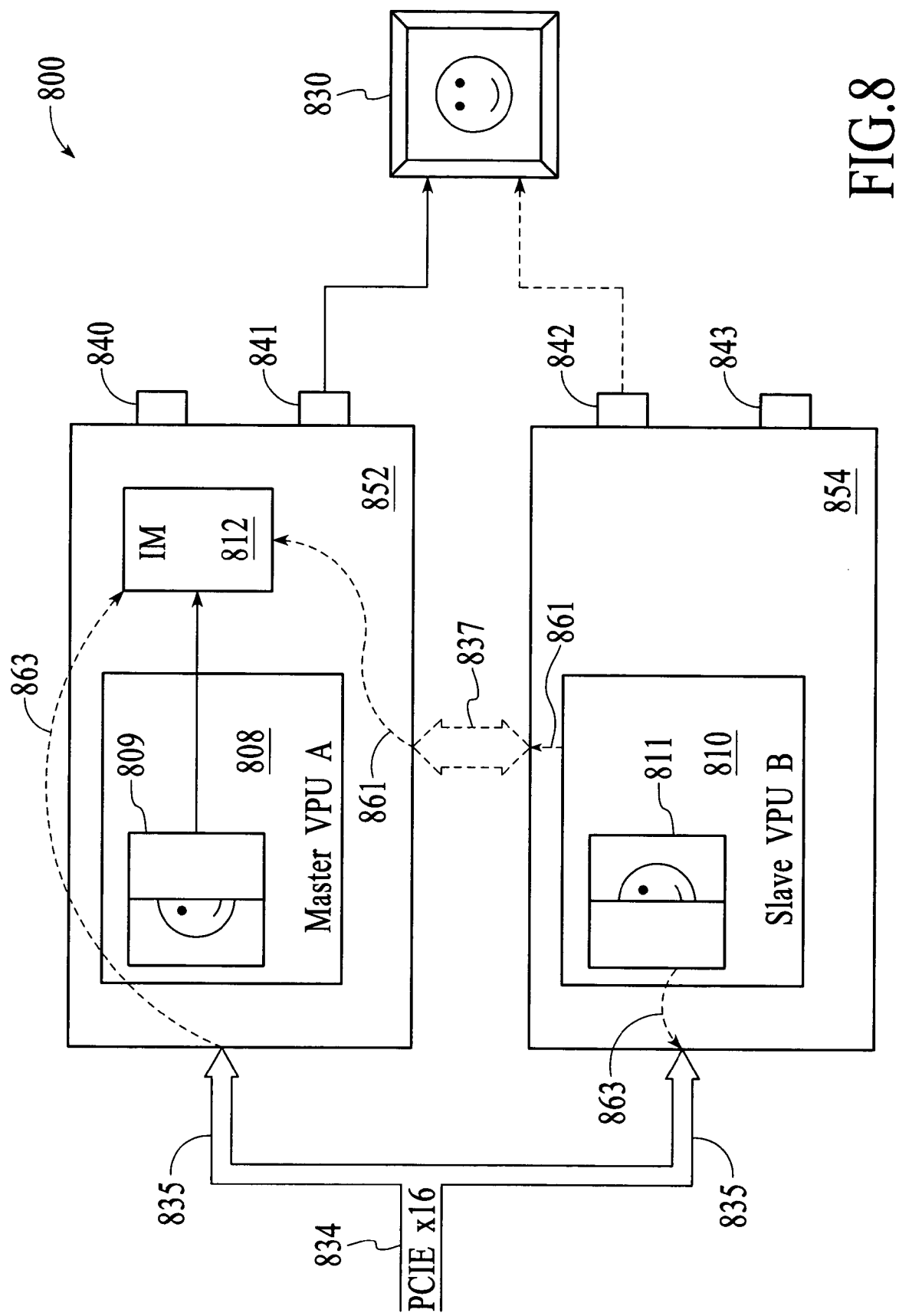
FIG. 8 is a block diagram of various components of a video processing system according to an embodiment.

FIG. 8 is a block diagram of various components of a system 800 according to an embodiment. The system 800 includes a master VPU card 852 and a slave VPU card 854. The master VPU card 852 includes a master VPU 808, and the slave VPU card 854 includes a slave VPU B 810. In one embodiment, VPUs 808 and 810 each communicate via a PICE bus 834. In one embodiment, the PCIE bus 834 is a X16 bus that is split into two X8 PCIE buses 835. Each of the VPUs A 808 and B 810 is connected to a bus 835. In one embodiment, VPU A 808 and VPU B 810 communicate only through the bus 835. In alternative embodiments, VPU A 808 and VPU B 810 communicate partially through bus 835 and partially through dedicated intercard connection 837. In yet other embodiments, VPU A 808 and VPU B 810 communicate exclusively through the connection 837.

The master VPU card 852 includes an IM 812. In an embodiment in which VPU A 808 and VPU B 810 communicate via the bus 835, each VPU processes frame data as instructed by the driver. As an example in FIG. 8, the system 800 is performing video processing in a "scissoring" load balancing mode as described below. Master VPU A 808 generates an output 809 and slave VPU B 810 generates an output 811. The outputs 809 and 811 are input to the IM 812 for compositing, as described further below. In one embodiment, the slave VPU B 810 transfers its output 811 to the IM 812 via the buses 835 and 834 as shown by the dotted path 863. In one embodiment, the slave VPU B 810 transfers its output 811 to the IM 812 via the dedicated intercard connection 837 as shown by the dotted path 861. The IM 812 combines the outputs 809 and 811 to produce a frame for display. This frame is output to a display 830 by the IM 812 via a connector 841.

The master VPU card 852 includes connectors 840 and 841. The slave VPU card 854 includes connectors 842 and 843. Connectors 840, 841, 842 and 843 are connectors appropriate for the purpose of transmitting the required signals as known in the art. For example, the connector 841 is a digital video in (DVI) connector in one embodiment. There could be more or less than the number of connectors shown in FIG. 8.

In one embodiment, the various configurations described herein are configurable by a user to employ any number of available VPUs for video processing. For example, the system 800 includes two VPUs, but the user could choose to use only one VPU in a pass-through mode. In such a configuration, one of the VPUs would be active and one would not. In such a configuration, the task sharing or load balancing as described herein would not be available. However, the enabled VPU could perform conventional video processing. The dotted path 865 from VPU card B 854 to the display 830 indicates that slave VPU B 810 can be used alone for video processing in a pass-through mode. Similarly, the master VPU A 808 can be used alone for video processing in a pass-through mode.

Figure 9:
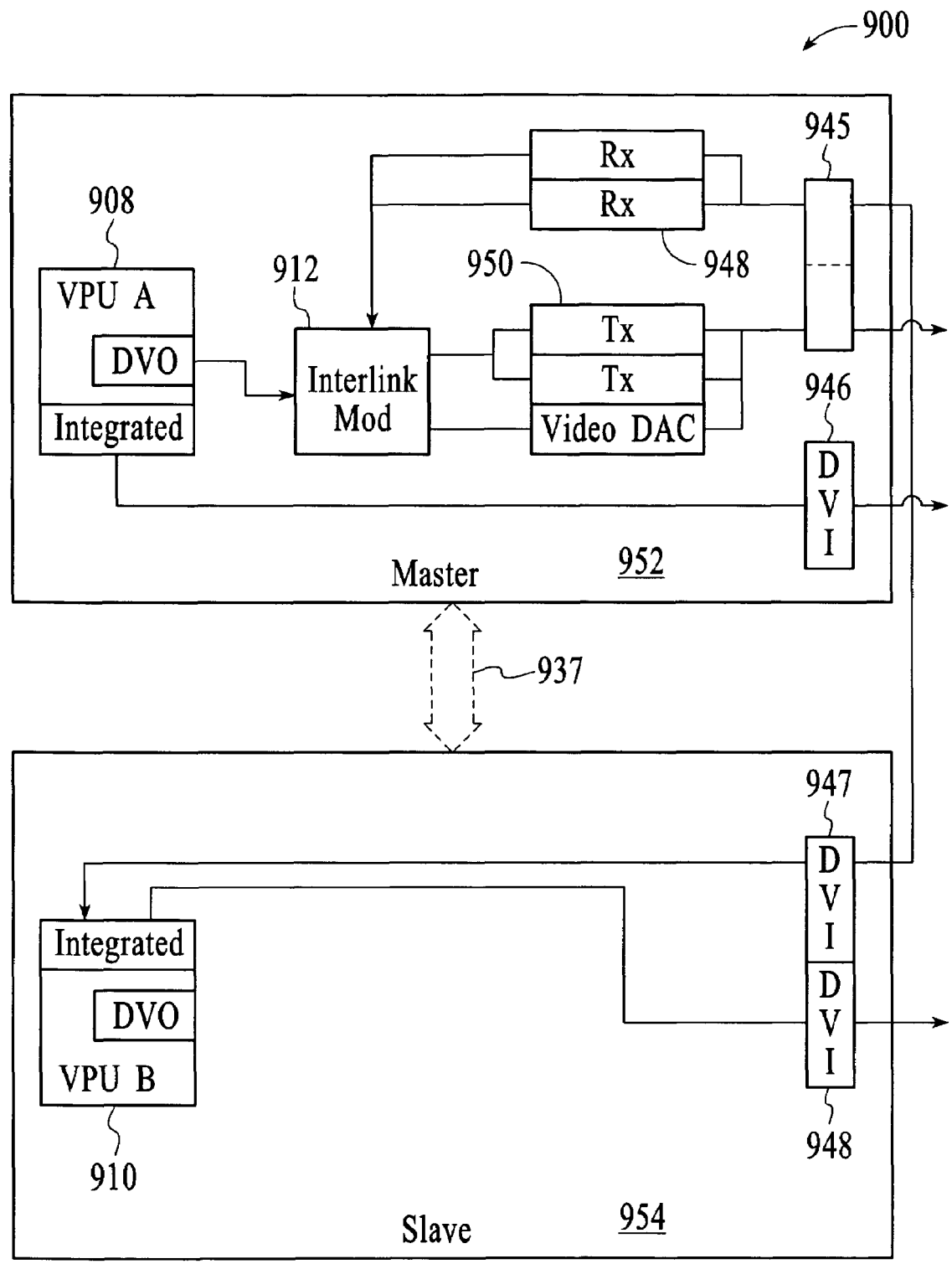
FIG. 9 is a more detailed block diagram of a video processing system, which is a configuration similar to that of FIG. 8 according to an embodiment.

FIG. 9 is a more detailed block diagram of a system 900, which is a configuration similar to that of FIG. 8 according to an embodiment. The system 900 includes two VPU cards, a master VPU card 952 and a slave VPU card 954. The master VPU card 952 includes a master VPU A 908, and the slave VPU card 954 includes a slave VPU B 910.

The master VPU card 952 also includes a receiver 948 and a transmitter 950 for receiving and transmitting, in one embodiment, TDMS signals. A dual connector 945 is a DMS connector in an embodiment. The master card further includes a DVI connector 946 for outputting digital video signals, including frame data, to a display. The master VPU card 952 further includes a video digital to analog converter (DAC). An interlink module (IM) 912 is connected between the VPU A 908 and the receivers and transmitters as shown. The VPU A 908 includes an integrated transceiver (labeled "integrated") and a digital video out (DVO) connector.

The slave VPU card 954 includes two DVI connectors 947 and 948. The slave VPU B 910 includes a DVO connector and an integrated transceiver. As an alternative embodiment to communication over a PCIE bus (not shown), the master VPU card 952 and the slave VPU card 954 communicate via a dedicated intercard connection 937.

Figure 10:
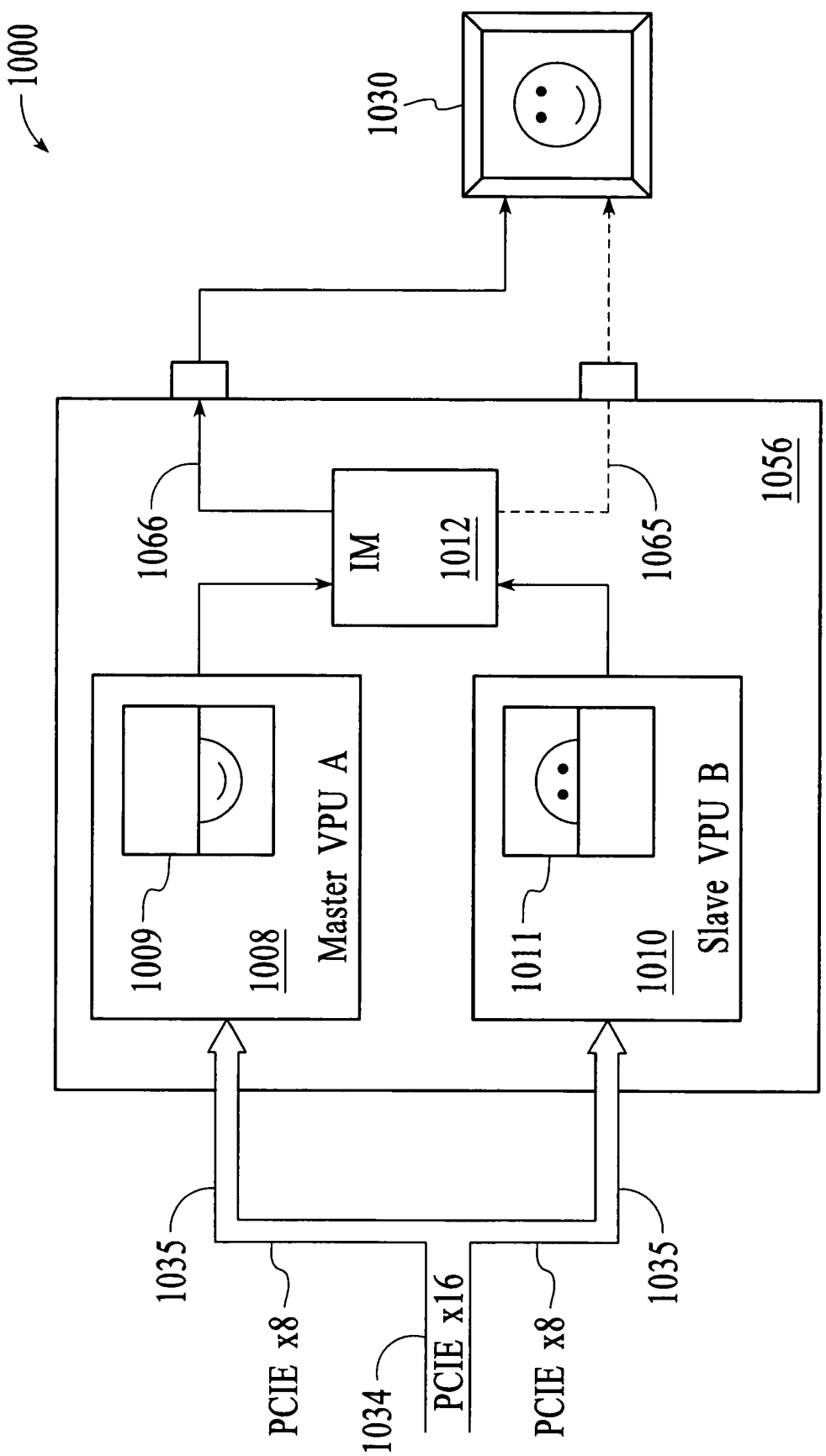
FIG. 10 is a diagram of a one-card video processing system according to an embodiment.

FIGS. 10-13 are diagrams of further embodiments of system configurations. FIG. 10 is a diagram of a one-card system 1000 according to an embodiment. The system 1000 includes a "supercard" or "monstercard" 1056 that includes more than one VPU. In one embodiment, the supercard 1056 includes two VPUs, a master VPU A 1008 and a slave VPU B 1010. The supercard 1056 further includes an IM 1012 that includes a compositor for combining or compositing data from both VPUs as further described below. It is also possible, in other embodiments, to have a dedicated on-card inter-VPU connection for inter-VPU communication (not shown). In one embodiment, the master VPU A 1008 and the slave VPU B 1010 are each connected to an X8 PCIE bus 1035 which comes from a X16 PCIE bus 1034.

The system 1000 includes all of the multiple VPU (also referred to as multiVPU) functionality described herein. For example, the master VPU A 1008 processes frame data as instructed by the driver, and outputs processed frame data 1009 to the IM 1012. The slave VPU B 1010 processes frame data as instructed by the driver, and outputs processed frame data 1011, which is transferred to the IM 1012 for combining or compositing. The transfer is performed via the PCIE bus 1034 or via a dedicated inter-VPU connection (not shown), as previously described with reference to FIG. 8. In either case, the composited frame is output from the IM 1012 to a display 1030.

It is also possible to disable the multiVPU capabilities and use one of the VPUs in a pass-through mode to perform video processing alone. This is shown for example by the dashed path 1065 which illustrates the slave VPU B 1010 connected to a display 1030 to output frame data for display. The master VPU A 1008 can also operate alone in pass-through mode by outputting frame data on path 1066.

Figure 11:
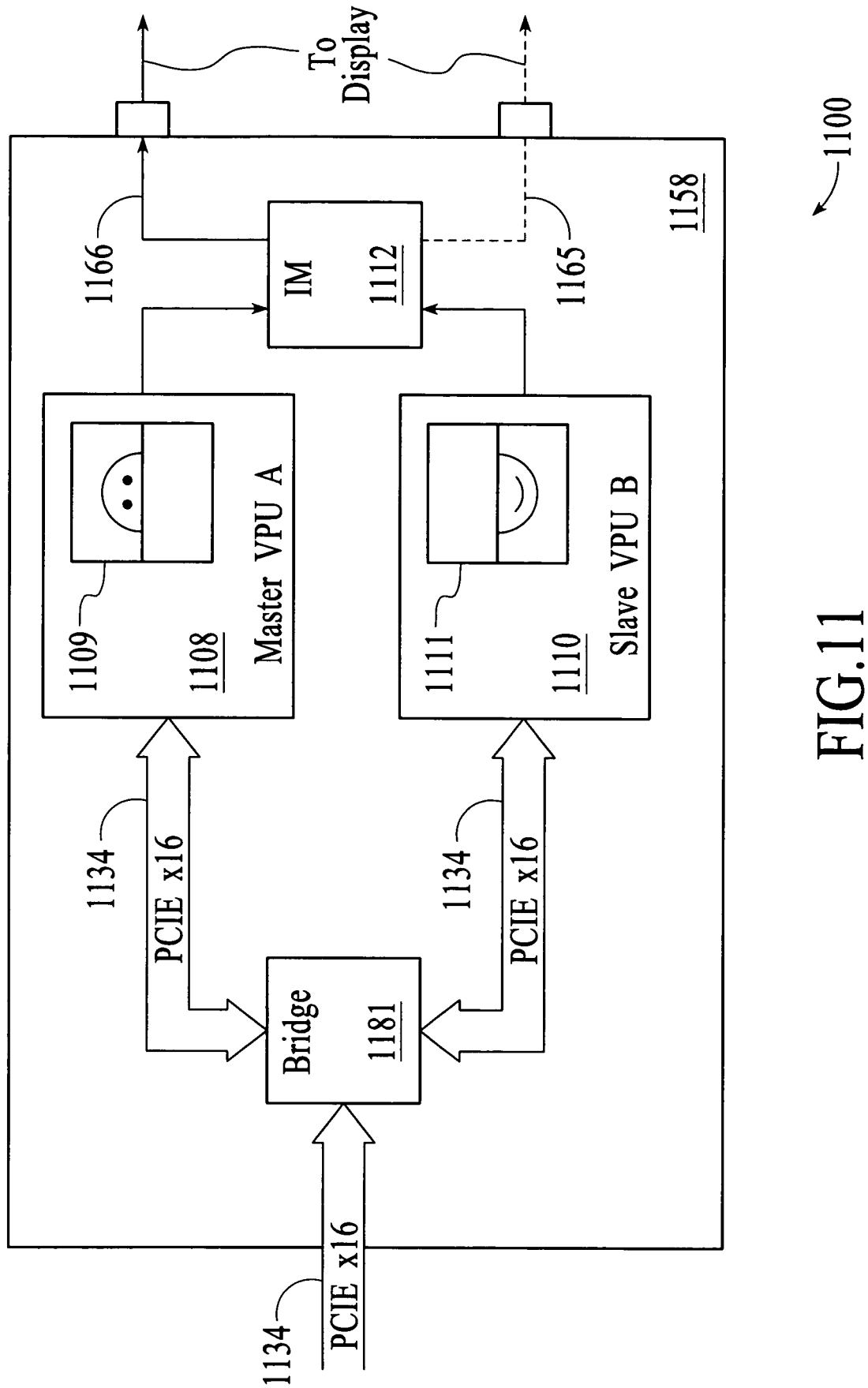
FIG. 11 is a diagram of a one-card video processing system according to an embodiment.

FIG. 11 is a diagram of a one-card system 1100 according to an embodiment. The system 1100 includes a "supercard" or "monstercard" 1158 that includes more than one VPU. In one embodiment, the supercard 1158 includes two VPUs, a master VPU A 1108 and a slave VPU B 1110. The supercard 1158 further includes an IM 1112 that includes a compositor for combining or compositing data from both VPUs as described herein. It is also possible, in other embodiments, to have a dedicated on-card inter-VPU connection for inter-VPU communication (not shown). In one embodiment, the master VPU A 1108 and the slave VPU B 1110 are each connected to a X16 PCIE bus 1134 through an on-card bridge 1181.

The system 1100 includes all of the multiVPU functionality described herein. For example, the master VPU A 1108 processes frame data as instructed by the driver, and outputs processed frame data 1109 to the IM 1112. The slave VPU B 1110 processes frame data as instructed by the driver, and outputs processed frame data 1111, which is transferred to the IM 1112 for combining or compositing. The transfer is performed via the PCIE bus 1134 or via a dedicated inter-VPU connection (not shown), as previously described with reference to FIG. 8. In either case, the composited frame is output from the IM 1112 to a display (not shown).

It is also possible to disable the multiVPU capabilities and use one of the VPUs in a pass-through mode to perform video processing alone. This is shown for example by the dashed path 1165 which illustrates the slave VPU B 1110 connected to an output for transferring a frame for display. The master VPU A 1108 can also operate alone in pass-through mode by outputting frame data on path 1166.

Figure 12:
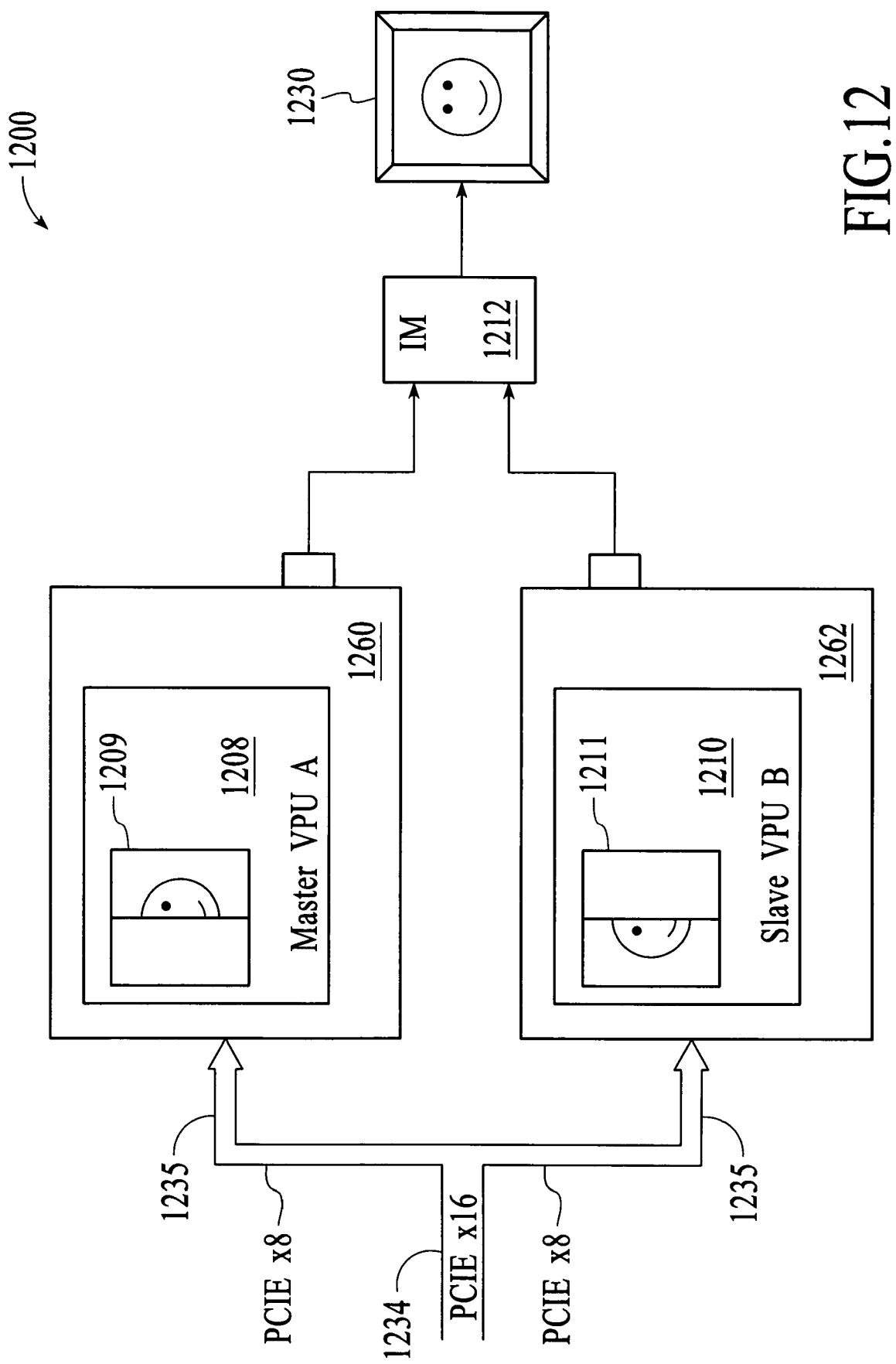
FIG. 12 is a diagram of a two-card video processing system according to an embodiment.

FIG. 12 is a diagram of a two-card system 1200 according to an embodiment. The system 1200 includes two peer VPU cards 1260 and 1262. VPU card 1260 includes a VPU A 1208, and VPU card 1262 includes a VPU 1210. In one embodiment, VPU A 1208 and VPU 1210 are identical. In other embodiments VPU A 1208 and VPU B 1210 are not identical. VPU A 1208 and VPU 1210 are each connected to an X8 PCIE bus 1235 that is split from a X16 PCIE bus 1234. VPU A 1208 and VPU 1210 are further each connected to output data through a card connector to an interlink module (IM) 1212. In one embodiment, the IM 1212 is an integrated circuit in a "dongle" that is easily connectable to VPU card 1260 and VPU card 1262. In one embodiment, the IM 1212 is an integrated circuit specifically designed to include all of the compositing functionality described herein. The IM 1212 merges or composites the frame data output by VPU A 1208 and VPU 1210 and outputs a displayable composited frame to a display 1230.

Figure 13:
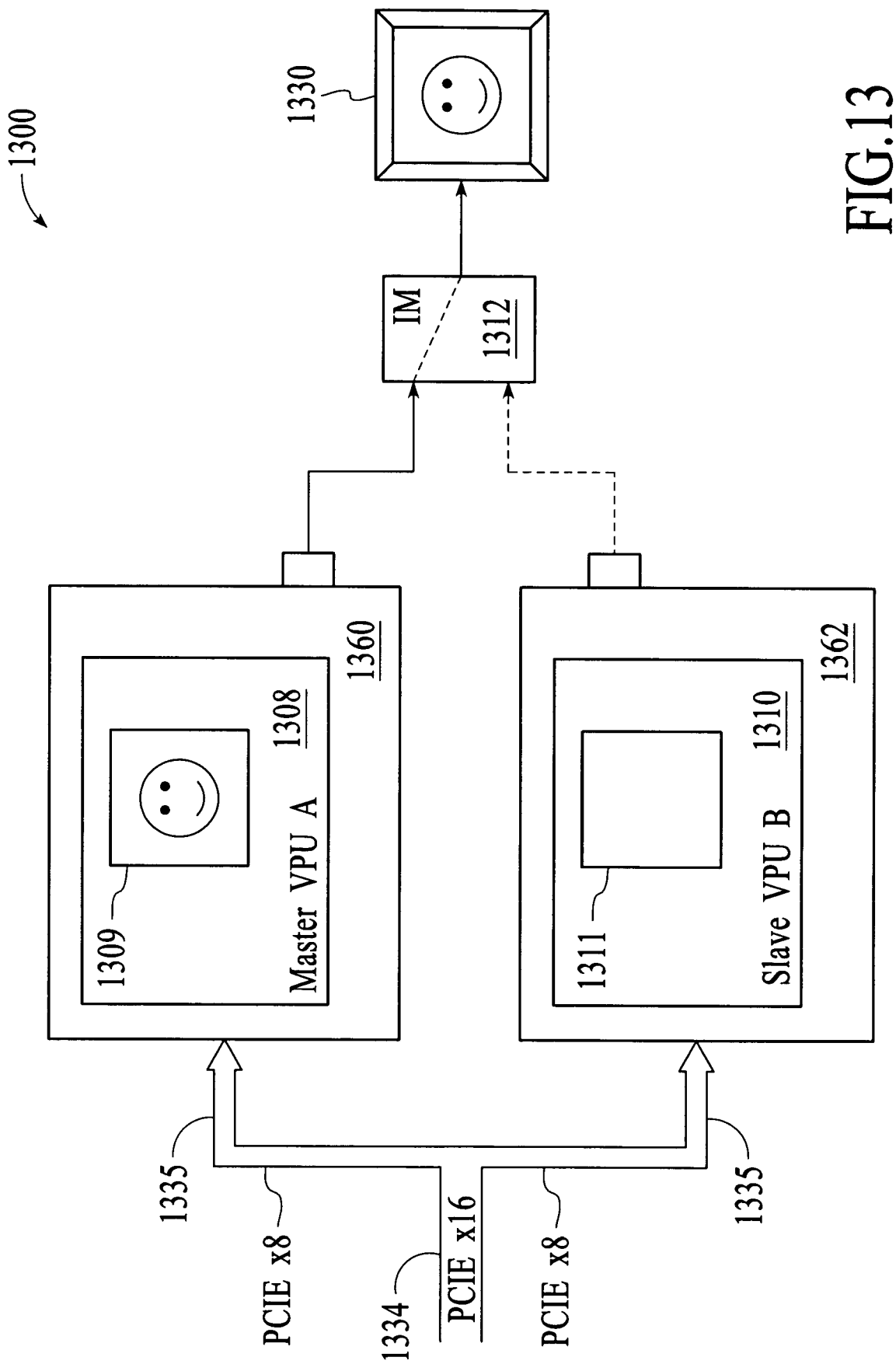
FIG. 13 is a diagram of a two-card video processing system according to an embodiment.

FIG. 13 is a diagram of a two-card system 1300 according to an embodiment. The system 1300 is similar the system 1200, but is configured to operate in a by-pass mode. The system 1300 includes two peer VPU cards 1360 and 1362. VPU card 1360 includes a VPU A 1308, and VPU card 1362 includes a VPU B 1310. In one embodiment, VPU A 1308 and VPU 1310 are identical. In other embodiments VPU A 1308 and VPU B 1310 are not identical. VPU A 1308 and VPU B 1310 are each connected to an X8 PCIE bus 1335 that is split from a X16 PCIE bus 1334. VPU A 1308 and VPU 1310 are further each connected through a card connector to output data to an interlink module (IM) 1312. In one embodiment, the IM 1312 is an integrated circuit in a "dongle" that is easily connectable to VPU card 1360 and VPU card 1362. In one embodiment, the IM 1312 is an integrated circuit specifically designed to include all of the compositing functionality described herein. The IM 1312 is further configurable to operate in a pass-through mode in which one of the VPUs operates alone and the other VPU is not enabled. In such a configuration, the compositing as described herein would not be available. However, the enabled VPU could perform conventional video processing. In FIG. 13, VPU A 1308 is enabled and VPU B 1310 is disabled, but either VPU can operate in by-pass mode to output to a display 1330.

The configurations as shown herein, for example in FIGS. 8-13, are intended as non-limiting examples of possible embodiments. Other configurations are within the scope of the invention as defined by the claims. For example, other embodiments include a first VPU installed on or incorporated in a computing device, such as a personal computer (PC), a notebook computer, a personal digital assistant (PDA), a TV, a game console, a handheld device, etc. The first VPU can be an integrated VPU (also known as an integrated graphics processor, or IGP), or a non-integrated VPU. A second VPU is installed in or incorporated in a docking station or external enclosed unit. The second VPU can be an integrated VPU or a non-integrated VPU.

In one embodiment, the docking station is dedicated to supporting the second VPU. The second VPU and the first VPU communicate as described herein to cooperatively perform video processing and produce an output as described. However, in such an embodiment, the second VPU and the first VPU communicate via a cable or cables, or another mechanism that is easy to attach and detach. Such an embodiment is especially useful for allowing computing devices which may be physically small and have limited video processing capability to significantly enhance that capability through cooperating with another VPU.

It will be appreciated by those of ordinary skill in the art that further alternative embodiments could include multiple VPUs on a single die (e.g., two VPUs on a single die) or multiple cores on a single silicon chip.

Figure 14:
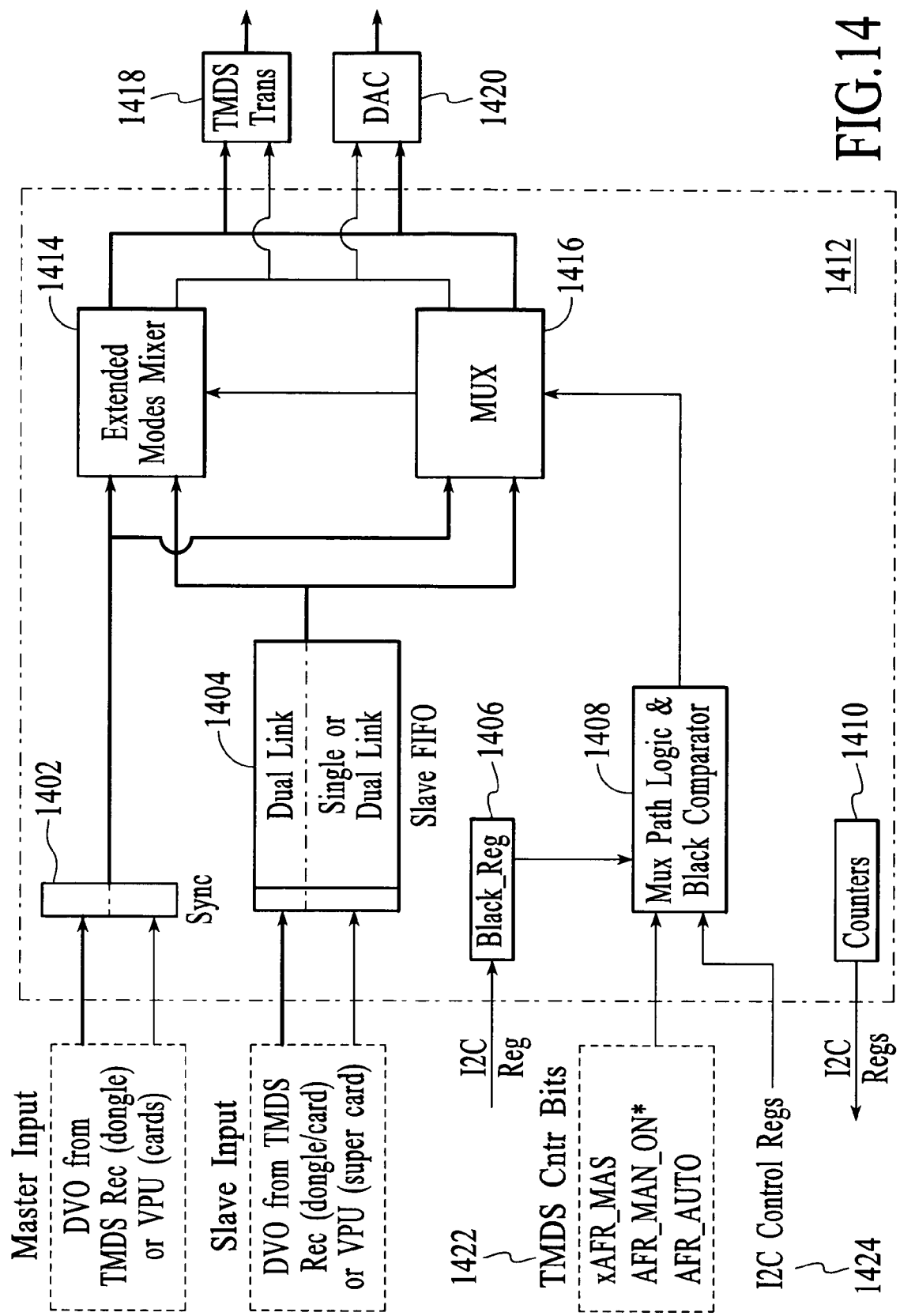
FIG. 14 is a block diagram of an interlink module (IM) according to an embodiment.

FIG. 14 is a block diagram of an interlink module (IM) 1412 according to an embodiment. All rendering commands are fetched by each VPU in the system. In any one of the multi VPU configurations described herein, after the VPUs execute the fetched commands, the IM 1412 merges the streams of pixels and control lines from the multiple VPUs and outputs a single digital video output (DVO) stream.

The IM 1412 includes a master input port that receives a DVO stream from a master VPU. The master VPU input can be from a TDMS receiver in a "dongle" configuration such as those shown in FIGS. 12 and 13. The master VPU input can alternatively come from a master VPU on a master VPU card in a multi-card configuration, as shown for example in FIGS. 8 and 9. A synchronization register 1402 receives the DVO data from the master VPU.

The IM 1412 further includes a slave input port that receives a DVO stream from a slave VPU. The slave VPU input can be from a TDMS receiver in a "dongle" configuration such as those shown in FIGS. 12 and 13 or a card configuration as in FIGS. 8 and 9. The slave VPU input can alternatively come from a slave VPU on a "super" VPU card configuration, as shown for example in FIGS. 10 and 11. The IM 1412 includes FIFOs 1404 on the slave port to help synchronize the input streams between the master VPU and the slave VPU.

The input data from both the master VPU and the slave VPU are transferred to an extended modes mixer 1414 and to a multiplexer (MUX) 1416. The IM 1412 is configurable to operate in multiple compositing modes, as described herein. When the parts of the frame processed by both VPUs are combined, either by the extended modes mixer 1414, or by selecting only non-black pixels for display, as further described below, the entire frame is ready to be displayed.

Control logic determines which compositing mode the IM 1212 operates in. Depending on the compositing mode, either the extended modes mixer or the MUX will output the final data. When the MUX is used, control logic, including a black register 1406 and a MUX path logic and black comparator 1408, determines which pixel (master or slave) is passed through the MUX. Data is output to a TDMS transmitter 1418 or a DAC 1420.

The black register is used to allow for software to set a final black value that has been gamma adjusted.

In one embodiment, the inter-component communication among the VPUs and the IM 1412 includes I2C buses and protocols.

Operating modes, including compositing modes, are set through a combination of I2C register bits 1424 and TMDS control bits 1422 as shown in Table 1.

TABLE 1

Operational Modes and Control Bits

| Category Main | Sub | I2C Bits | TMDS Cntr Bits | Notes |
|---|---|---|---|---|
| Passthru | Slave | INTERLINK_ENABLE = 0<br>CONTROL_BITS_2: Bit 3 = x | n/a | Uses $1^{st}$ I2C access to determine path |
| Passthru | Master | INTERLINK_ENABLE = 0<br>CONTROL_BITS_2: Bit 3 = x | n/a | Uses $1^{st}$ I2C access to determine path |
| Interlink | AFR_MANUAL | INTERLINK_ENABLE = 1<br>CONTROL_BITS_2: Bit 3 = 0 | AFR_MAN_ON* = 0<br>AFR_AUTO* = 1 | xAFR_MAS state changes controls the next data path |
| Interlink | AFR_AUTO | INTERLINK_ENABLE = 1<br>CONTROL_BITS_2: Bit 3 = 0 | AFR_MAN_ON* = 0<br>AFR_AUTO* = 0 | |
| Interlink | BLACKING | INTERLINK_ENABLE = 1<br>CONTROL_BITS_2: Bit 3 = 0 | AFR_MAN_ON* = 1<br>AFR_AUTO* = x | Uses black pixels to determine data path |
| Interlink | Super AA | INTERLINK_ENABLE = x<br>CONTROL_BITS 2: Bit 3 = 1 | n/a | CONTROL_BITS_2: Bit 4-7 determines extended mode |

There are two separate data paths through the IM 1412 according to an embodiment. The two input pixel streams from the respective VPUs are either processed through the MUX 1416 (in pass-through mode, or "standard" interlink modes), or through the mixer 1414 in extended modes. In one embodiment, the extended modes include a super antialiasing mode, or "SuperAA mode", as described in copending U.S. Patent Application Serial No. Not Yet Assigned, titled "Antialiasing System and Method", which is hereby incorporated by reference in its entirety.

In the MUX 1416, just one pixel from either VPU A or VPU B is selected to pass through, and no processing of pixels is involved. In the extended modes mixer 1414, processing is done on a pixel by pixel basis. In SuperAA mode, for example, the pixels are processed, averaged together, and reprocessed. In one embodiment, the processing steps involve using one or more lookup tables to generate intermediate or final results.

The selection between the MUX 1416 path and the mixer 1414 path is determined by I2C register bits and control bits. For example, the mixer 1414 path is selected if:

ENABLE_INTERLINK=1 (I2C register)

and CONTROL_BITS_2: Bit 3 and Bit 4=1 (Extended-Modes and SuperAA)

(else MUX).

In one embodiment, the IM has three ports, two input ports and one output port.

The output port configuration is split into two parts. The DAC is driven across a 24 bit single data rate (SDR) interface. The TMDS is driven with a double data rate (DDR) interface; a 12 pin interface for TMDS single link, and a 24 pin interface for TMDS dual link. The I2C control bit registers determines this configuration.

There are three primary pixel clock domains. Both the master and slave inputs come in on their own separate domains. The IM uses the DVO clock domain for all internal paths and the final output. The DVO clock is generated by the active input port in pass-through mode and from the master input clock in interlink mode.

The master input bus (data and control) goes through a synchronizer as it passes into the DVO clock domain, imparting a 2-4 clock delay. The slave input bus (data and control) goes into a FIFO which is synchronized on its output to the DVO clock domain. The outputs of both paths are routed to a MUX or extended modes mixer, which then outputs a single bus width data output.

In slave pass-through mode the slave FIFO is set into pass-through mode, while in interlink mode, it is used as a standard FIFO. For slave pass-through mode, the control bits go through the FIFO with the pixel data. In interlink mode, sAFR_MAS goes through with the data, and the control bits are ignored from the slave input port.

I/Os that use DDR clocking are split into double wide buses (e.g., 12-bit DDR input becomes 24 bits internally). This is to avoid having to run the full clock speed through the IM.

In one embodiment, there is one FIFO on the IM 1412, located on the slave channel. Twenty-four (24) bits of pixel data flow through the FIFO in single TMDS mode, and 48 bits of data flow through the FIFO in dual TMDS mode. The slave port's control bits are also carried through this FIFO when in pass-through mode, slave path. When in interlink mode, the control bits are ignored, and instead of the control bits the sAFR_MAS bit is carried through in parallel with the pixel data.

When in single link TMDS mode (CONTROL_BITS:Dual_Link_Mode bit=0), the extra 24 bits of data for dual link are not clocked to conserve power.

On power up the FIFOs should be set to empty. FIFOs are also cleared when the ENABLE_INTERLINK bit toggles to 1 or if the CONTROL_ONESHOTS: FIFO_Clear bit is set to 1.

The slave FIFO has two watermarks (registers FIFO_FILL, FIFO_STOP). The IM drives the SlavePixelHold pin depending on how full the FIFO is and the values in these registers. If the slave FIFO has FIFO_FILL or fewer entries in use, the SlavePixelHold should go low. If the slave FIFO has FIFO_STOP or more entries in use, the SlavePixelHold should go high.

Figure 15:
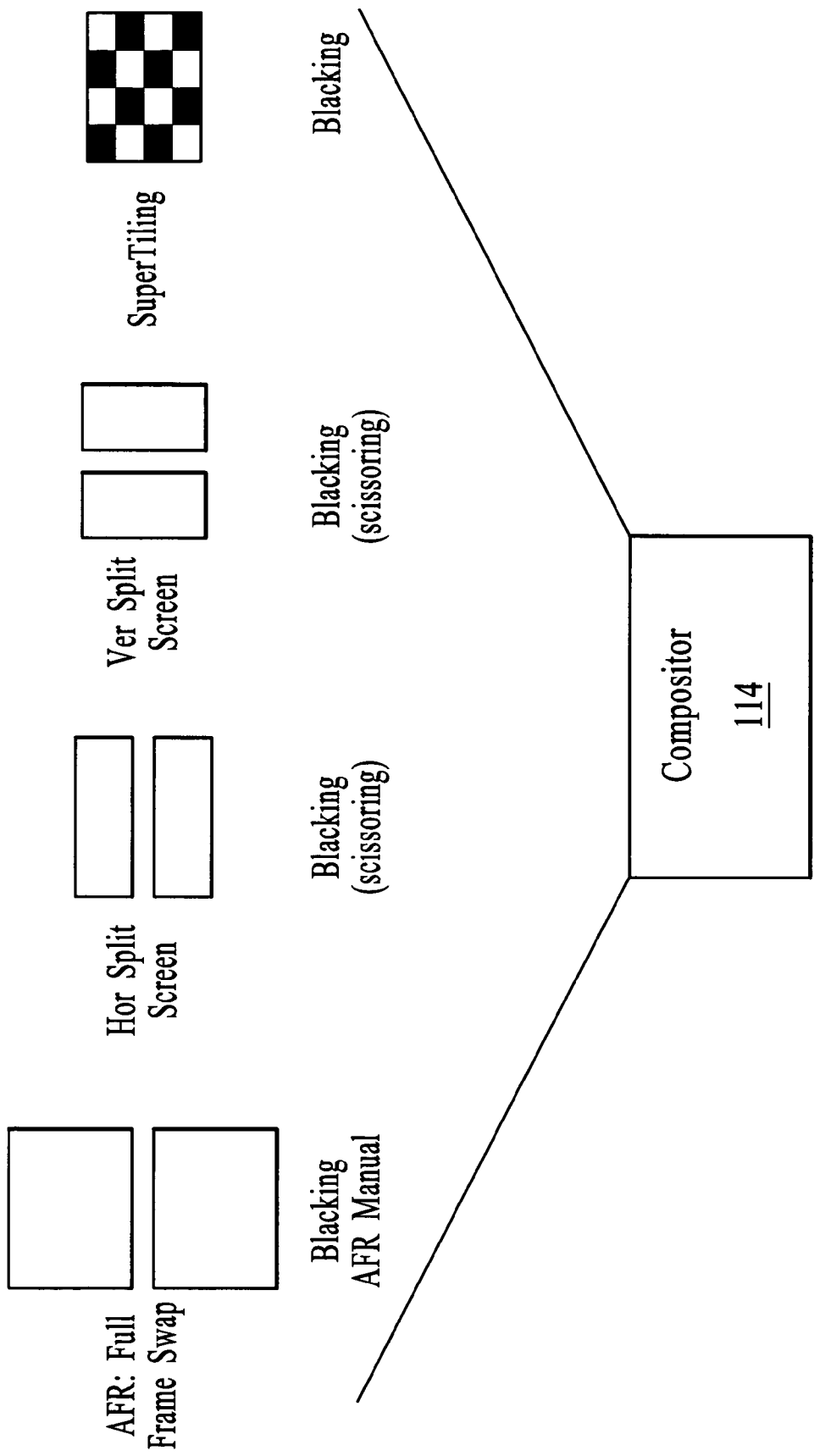
FIG. 15 is a diagram illustrating various load balancing modes according to an embodiment.

"Load balancing" refers to how work is divided by a driver for processing by multiple system VPUs. In various embodiments, the processed data output by each VPU is composited according to one of multiple compositing modes of the IM 1412, also referred to herein as "interlinking modes" and "compositing modes". The IM 1412 supports numerous methods for load balancing between numerous VPUs, including super-tiling, scissoring and alternate frame rendering ("AFR"), all of which are components of "Blacking". These modes are described below. FIG. 15 is a diagram illustrating various load balancing modes performed by the system as described. Frame data from various VPUs in the system is processed according to a load balancing mode and composited in a compositor 114 (see FIG. 1 for example), as described herein, to generate a displayable frame.

For Super-Tiling, software driver control determines the tile size and alternates between image data and black tiles so that, between the master and slave VPUs, each frame is fully painted. The IM 1412 passes through the non-black pixels (image data) creating a super tiling-type split between the master and slave inputs. The tile sizes can be dynamically adjusted every pair of master and slave frames if desired.

Super-Tiling may divide a display screen into a chess board pattern for which each square/tile is 32×32, pixels for example. The image tiles are rendered on a first VPU of a multi-VPU system while the black tiles are rendered on a second VPU. Super-Tiling provides fine grain load sharing for pixel processing within a frame of rendering, a more even distribution of pixel load relative to other load balancing methods, and less complex driver implementation.

Scissoring divides a display screen into two parts, and this division can be horizontal or vertical. While a horizontal split may be more convenient when considering software implementation and data transfer flexibility, a vertical split may provide better load balancing. In the context of multiple VPUs, scissoring provides optimization opportunities in the direction of parallelizing data transfers with 3D rendering. Scissoring also supports methods in which the slave VPU (which performs the majority of data transfers) does less work than the master VPU, thereby facilitating dynamic load balancing schemes between the master and the slave VPUs.

Scissoring includes both Vertical Split Screen Blacking Control and Horizontal Split Screen Blacking Control. With Vertical Split Screen Blacking Control, the drivers determine which side of a frame are output from the master and slave VPU, so that between the two VPUs every frame is completely painted. The part of a frame that each VPU does not handle is cleared to black by the drivers. The IM 1412 then interlinks the two frames as a vertical split between the master and slave VPU. The split does not have to be an even split of the screen (e.g., 50% rendered by each VPU) and can be dynamically adjusted for every pair of master and slave frames.

Under Horizontal Split Screen Blacking Control, the software drivers determine which upper or lower section of a frame are output from the master and slave VPU. The drivers then clear to black the portions that will not hold valid frame buffer data and the IM 1412 mixes the inputs as a horizontal split of the inputs. The split does not have to be an even split of the screen (e.g., 50% rendered by each VPU) and can be dynamically adjusted for every pair of master and slave frames.

Alternate Frame Rendering ("AFR") performs load balancing at a frame level. A "frame" as referred to herein includes a sequence of rendering commands issued by the application before issuing a display buffer swap/flip command. AFR generally passes each new frame through to the output from alternating inputs of the IM 1412. One VPU renders the even-numbered frames and the other VPU renders the odd-numbered frames, but the embodiment is not so limited. The AFR allows performance scaling for the entire 3D pipeline, and avoids render-to-texture card-to-card data transfers for many cases.

The IM 1412 of an embodiment may perform AFR under Manual Control, Manual Control with automatic VSync switching, or Blacking Control. When using Manual Control, the drivers manually select an input of the IM 1412 for a frame after the next VSync. Using AFR using Manual Control with VSync switching, and following a next vertical blank, the IM 1412 chooses the input coupled to the master VPU as the output source and then automatically toggles between the master and slave VPU inputs on every VSync. Using Blacking Control, the drivers alternate sending a fully painted frame versus a cleared-to-black frame from the master and slave VPUs; the IM 1412 toggles between the master and slave frames as a result.

Other compositing strategies are available and are not limited by the IM 1412. For example, extended interlink modes are also available that go beyond the load sharing usage of the Manual AFR and Blacking modes. These modes, while not the standard interlinking used for pure speed gains by sharing the processing between multiple VPUs, enhance the system quality and/or speed by offloading functionality from the VPUs to the IM 1412. As one example of an extended mode, the IM 1412 of an embodiment supports the "SuperAA" mode previously referred to in addition to the Manual AFR and Blacking modes.

Referring again to FIG. 14, the IM 1412 supports multiple input modes and single or dual link TMDS widths, depending on the input connectivity. The IM 1412 also includes counters that monitor the phase differences between the HSyncs and VSyncs of the two inputs. The counters may include a pixel/frame counter to assist in matching the clocks on the two input streams.

Referring to Table 3, in one embodiment, the IM 1412 has three counters 1410. Each counter increments the master pixel clock and uses one of the VSyncs for latching and clearing.

If a read of an I2C counter is occurring, the update to that register is held off until after the read is completed. If a write of the register is occurring, then the read is delayed until the write is completed. Read delays are only a few IM internal clocks and therefore are transparent to software.

the two received inputs into a single output stream. The output DVO signals from the IM 1412 are then fed either to a TMDS transmitter or through a DAC, both of which drive out through a standard DVI-I connector for example.

The input streams received at the IM 1412 inputs are referred to herein as the "master input" and the "slave input", and are received from the master and slave VPUs, respectively. The master and slave VPUs may be on two separate cards or on a single "super" card. Either VPU can function as the master or slave VPU.

The master VPU is used as the primary clock to which the slave is synchronized ("synced"). The master clock is not adjusted or tuned other than the normal card initialization process. The slave VPU is adjusted to run slightly ahead of the master VPU to allow for synchronization and FIFO latencies. The slave VPU uses a larger FIFO in order to compensate for variances between the pixel clock rates of the two VPUs, while the master VPU path uses a shallow FIFO only to synchronize the master input clock domain to the internal DVO clock domain. Flow control between the master and slave VPUs includes initial synchronization of the two VPUs and then ongoing adjustments to the slave VPU to match the master VPU. The flow control includes clock adjustments via

TABLE 3

| | IM Counters | | |
|---|---|---|---|
| Counter Name | Bits | Clock | Description |
| CLKS_PER_FRAME_CTR | 22 | Master Pixel | Number of master clocks per 1 slave frame uses slave VSync to determine frame edges every slave VSync latches the count to CLKS_PER_FRAME and resets this counter |
| S2M_VSYNC_PHASE_CTR | 11 | Master Pixel | Number of lines displayed between slave VSync and master VSync latched to S2M_VSYNC_PHASE every master VSync resets the count to 0 every slave VSync |
| S2M_HSYNC_PHASE_CTR | 12 | Master Pixel | Number of pixels displayed between slave HSync and master HSync latched to S2M_HSYNC_PHASE every master HSync resets the count to 0 every slave HSync |

The IM 1412 may be used in a number of configurations as described above. In one configuration, referred to herein as a "dongle", the IM 1412 receives two separate TMDS outputs, one each from two separate VPUs, and brings them onto the dongle through two TMDS receivers. The separate receivers then output two DVO streams directly into the IM 1412 of the dongle. The IM 1412 mixes the two received inputs into a single output stream. The output DVO signals from the IM 1412 are then fed either to a TMDS transmitter or through a DAC, both of which drive out through a standard DVI-I connector on the dongle.

In another configuration, referred to herein as an "on-card" configuration, the IM 1412 receives two streams of DVO signals directly from two VPUs that reside on the same card as the IM 1412. This on-card configuration does not use TMDS transmitters or receivers between the VPUs and the IM 1412, in contrast to the dongle configuration. The IM 1412 mixes a pixel hold off signal generated by the IM 1412 or driver action in response to counters within the IM 1412.

The IM 1412 as described above supports numerous operational modes, including Pass-through Mode and various Interlink Modes, as illustrated in Table 1. These operational modes are set through a combination of I2C register bits and the TMDS Control Bits as described herein.

Pass-through Mode is a mode in which an input of the IM 1412 is passed directly through to the output (monitor). The input port used is chosen at power-up by the initial toggling of an I2C clock. The path can be changed again by switching the ENABLE_INTERLINK register from "1" back to "0" and then toggling the I2C clock of the desired port.

Interlink Modes include numerous modes in which the IM 1412 couples inputs received from the master and slave VPUs to an output in various combinations. Dual VPU Interlink Modes of an embodiment include but are not limited to Dual AFR Interlink Mode, and Dual Blacking Interlink Mode.

Dual VPU Interlink Modes are modes in which both VPUs are being used through manual AFR control or through blacking modes. Both IM 1412 ports are output continuously during operations in these mode.

Dual AFR Interlink Mode includes modes in which the source of the IM 1412 output is alternated between the two input ports. It can either be done manually by the IM 1412 drivers or automatically once started based on VSync. Control of the Dual AFR Interlink Mode includes use of the following bits/states: AFR_MAN_ON*=low; AFR_AUTO*=high or low; AFR_MAS (used to control which card is outputting at the time or to set the first card for the Auto switch).

Figure 16:
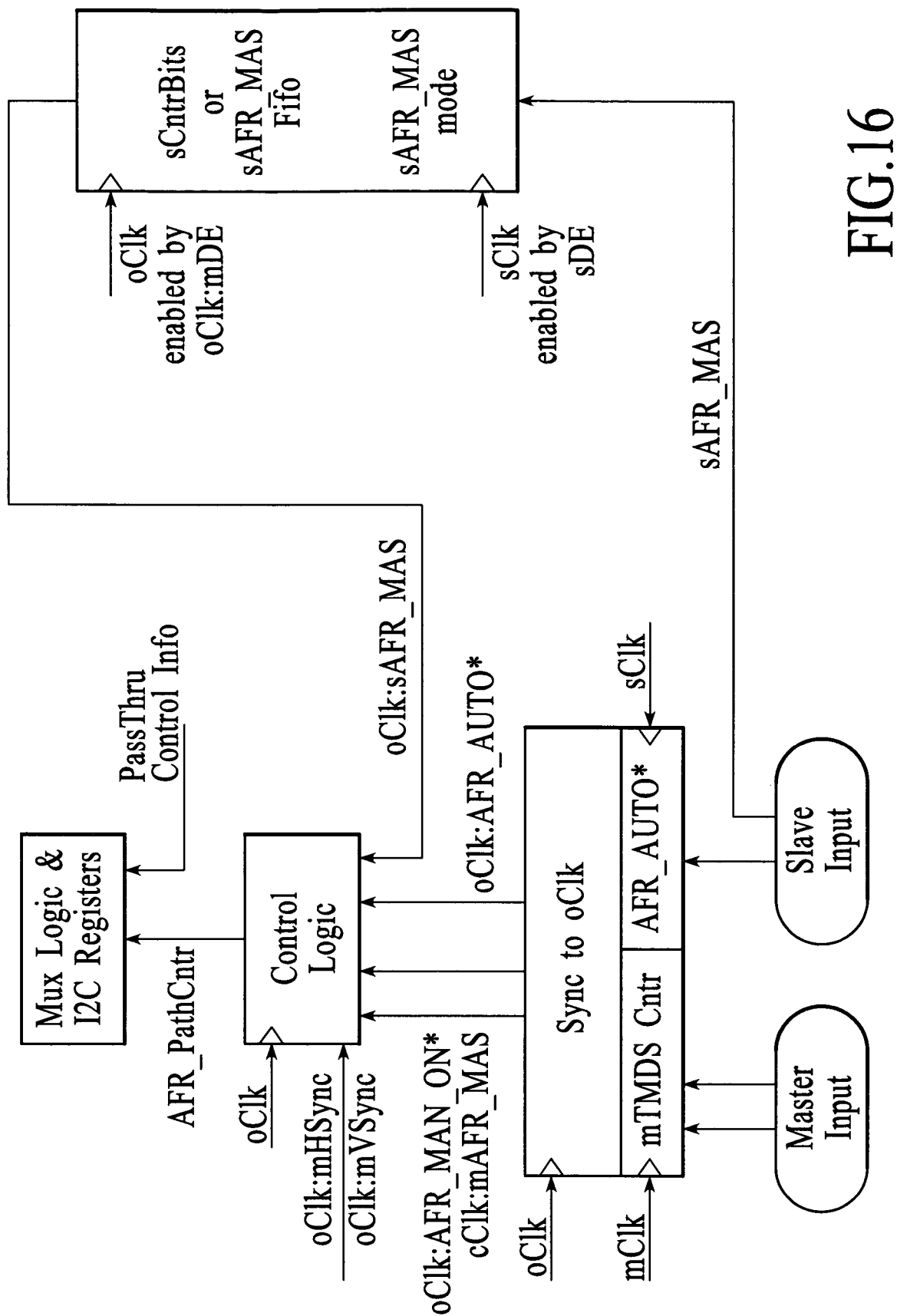
FIG. 16 is a block diagram of path control logic of an interlink module (IM) according to an embodiment.

FIG. 16 shows path control logic of the IM. oClk is the output pixel clock. It is generated in slave passthru directly from the sClk from the slave port. In interlink or master pass-through modes, it is generated directly from the mClk from the master port with the same timings. oClk:mDE is simply the master port's mDE signal synchronized into the oClk time domain.

Dual Blacking Interlink Mode includes modes in which both VPUs output in parallel and the IM 1412 forms an output by selecting pixels on a pixel-by-pixel basis by transmitting black pixel values for any pixel of any VPU that should not be output. Control of the Dual Blacking Interlink Mode includes use of the following bit/state: AFR_MAN_ON*=high.

AFR_MAN_ON* is sent across the master TMDS Control Bit bus on bit no 2. It is clocked in with mClk, one clock before the rising edge of mDE after the rising edge of mVSync. The action in response to it takes place before the first pixel of this mDE active period hits the MUX. Other than this specific time, there is no direct response to AFR_MAN_ON*.

When AFR_MAN_ON* is active (LOW) and ENABLE_INTERLINK is set to 1 and the ExtendedModes bit is 0, then the path set by the pixel MUX is controlled by the xAFR_MAN bits as described below.

The I2C register reflects the result after the resulting action occurs. It does not directly reflect the clocked in bit.

AFR_AUTO* is sent across the slave TMDS Control Bit bus on bit no 2. It is clocked in with sClk timings and then synced to mClk. It is latched in the clock before mDE goes high after the rising edge of mVSync. The action in response to it then occurs before the first pixel associated with the active mDE hits the MUX and only if AFR_MAN_ON* is low on the same latching point.

When AFR_AUTO* and AFR_MAN_ON* are active and ENABLE_INTERLINK is set to 1 and extended interlink modes are not active, then the path set by the pixel MUX is initially set to the master path. The path is then automatically toggled on every rising edge of mDE after the rising edge of mVSync until AFR_AUTO* is deasserted.

The I2C register reflects the result after the resulting action occurs. It does not directly reflect the clocked in bit.

The mAFR_MAS is set from the master port on mLCTL[1] and sAFR_MAS is set from the slave port on sLCTL[1]. These two bits control which path is set by the pixel MUX when in Interlink mode, manual AFR control.

The mAFR_MAS is clocked directly in with mCLK. The sAFR_MAS is clocked in with sCLK and then synced to mCLK. The bits are latched on the rising clock edge before the rising edge of mDE. Both latched bits then go into a logic block which detects a bit changing state. Depending on an I2C register bit, either after the rising edge of a VSync or an HSync, if a bit is detected as having its state changed, the logic sets the pixel MUX when in AFR_MANUAL Interlink mode to match the path of the toggled bit. The MUX will not change during AFR_MANUAL interlink mode at any other time.

If both bits toggle in the same updating time frame, then the master path is set.

Unlike the other control bits, the I2C register reflects the individual synchronized bits going into the MUX control logic block clocked in with MClk and not the bits after the sync state.

Regarding data and control paths in the IM 1412 of an embodiment, the Dual VPU Interlink Mode works in routing modes that include pass-through, dual/single input AFR Manual interlink, and dual input Blacking Interlink. These routing modes describe which of the data and control lines from the two receivers get transmitted out of the IM 1412 via the transmitter or DAC. Table 2 shows the data, control, and clock routing by routing mode of the IM 1412, under an embodiment.

The clock is the pixel clock, the internal control lines are the lines that connect between the TMDS transmitter and receivers (and IM 1412), and the external control lines are lines that are not processed by the TMDS circuitry such as I2C and Hot Plug.

The Slave pixel hold off signal goes directly between the IM 1412 and the Slave DVI VSync pin.

TABLE 2

| Routing Mode | Clock | Internal Control | ByPass Control | Data | Notes |
|---|---|---|---|---|---|
| Pass-Through | Master or Slave | Master or Slave | Master or Slave | Master or Slave | set by first I2C clock toggling |
| AFR Manual | Master or Slave | Master or Slave | Master or Slave | Master or Slave | set by AFR_MAN control bit |
| Blacking | Master | Master | Master | Master and Slave | Data is interlinked depending on black pixels |

Pass-Through occurs when using the IM 1412 in single-VPU Mode and before the drivers set up the IM 1412 and VPUs for the dual-VPU mode. At power up, the IM 1412 20 defaults the MUX to pass all data and control lines directly from the master VPU to the output of the IM 1412. As soon as the IM 1412 sees one of the input TMDS I2C clocks toggling, it sets the MUX to pass that specific channel to the output. This includes the clock and all control signals, whether it is from the master or slave VPU. This allows the IM 1412 to connect the default video card of the system directly through to the monitor during power-up BIOS operation, even before the drivers are aware of existence of the IM 1412.

In the Dual VPU Interlink Mode, once the drivers are loaded, the drivers can detect if the IM 1412 exists and if there are one or two connections to the IM 1412. The detection is done by reading the I2C ID register of the IM 1412 through the port of each VPU. The drivers can determine which discovered connection is the master and which is the slave by the value of bit 0 of the IM 1412 ID register read on each port.

If only one connection is found, the IM 1412 is left in Pass-through mode. If two connections are found to the IM 1412, the driver then takes over the screen control, setting the MUX of the IM 1412 to output from the master port, with the VPU connected to the master port as the master VPU. The clock is driven from this port until the power is lost or one of the input connections to the IM 1412 is broken.

The MUX of an embodiment is set by mechanisms that include Pass-Through initial states, AFR Manual Control, and Blacking Control. These modes and the particular controls for each are set through the TMDS CNTR bits, with the IM 1412 responding on the next vertical blanking period. The master/slave switch (AFR_MAS) can latch in/occur on either the next HSync or the next VSync depending on the I2C control bits setting.

In addition to using TDMS control registers, the drivers also control and monitor the IM functionality using I2C control registers.

I2C registers are used for control and monitoring that does not need to happen every frame or faster. The registers can be available through both the master and slave ports of the IM.

For more dynamic control, the I2C control registers are used to set different multi VPU modes and to manually switch the IM data path.

In one embodiment of a video processing system, inter-integrated circuit communication for the IM is accomplished using an Inter-Integrated Circuit (I2C) bus. I2C is a bus typically used to connect integrated circuits (ICs). I2C is a multi-master bus, which means that multiple ICs can be connected to the same bus and each one can act as a master by initiating a data transfer.

Figure 17:
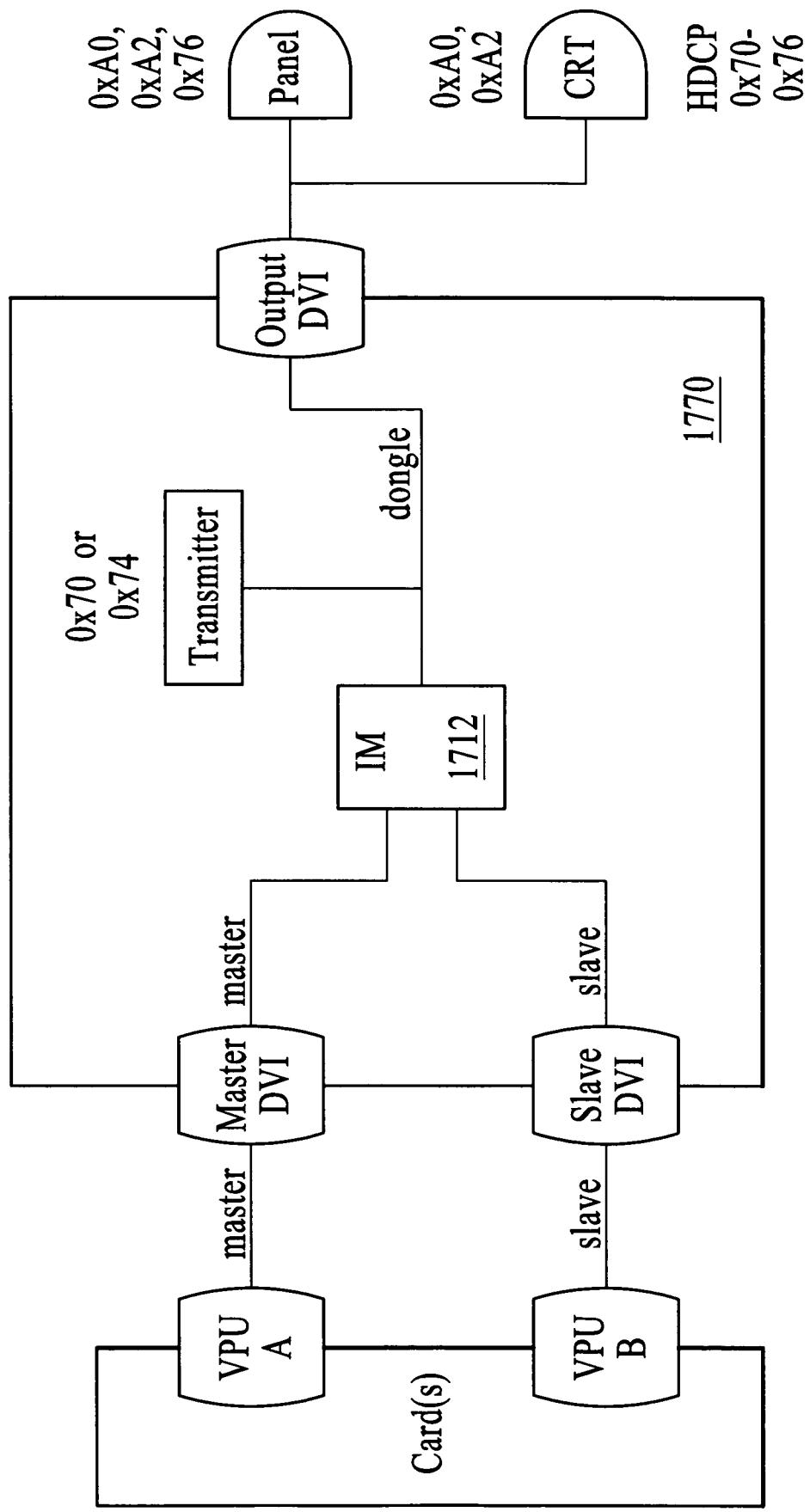
FIG. 17 is a block diagram of I2C paths according to a dongle embodiment.

FIG. 17 is diagram of an embodiment of an IM 1712 on a dongle 1770, showing various I2C paths. The dongle 1770 receives data from a master VPU A and a slave VPU B. In an embodiment, the master VPU A and the slave VPU B reside on one or more VPU card(s). In an embodiment, there are three separate I2C buses for the IM 1712. There is an I2C bus from each of two input ports, a master input port and a slave input port. A third I2C bus goes from the IM 1712 to transmitter, and to any connected output device, such as panel and/or cathode ray tube (CRT).

The two input I2C buses each feed through the DVI master and slave input ports into the dongle 1770 and directly into the IM 1712 on two separate channels.

Figure 18:
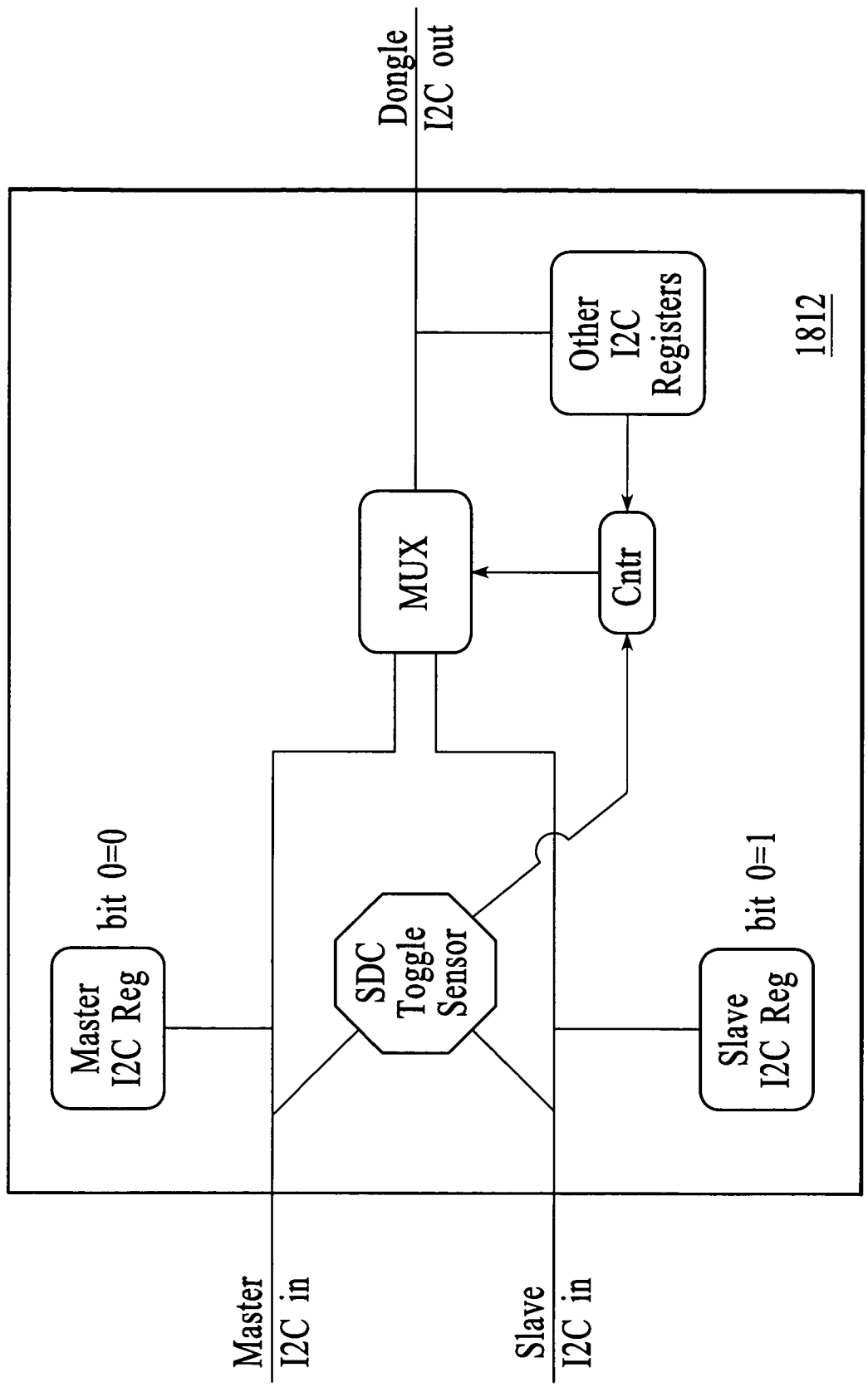
FIG. 18 is a block diagram of I2C paths of an interlink module (IM) according to an embodiment.

FIG. 18 is a diagram of I2C paths within an IM 1812 according to an embodiment. The IM 1812 includes a master identification (ID) I2C register and a slave ID I2C register. The IM 1812 further includes an SDC toggle sensor, a MUX, and other I2C registers.

Either of VPU A or VPU B can access the ID registers directly through respective input ports without concern for I2C bus ownership.

The IM 1812 has one set of registers which are I2C accessible at a particular I2C device address. All other addresses are passed through the IM 1812 onto the I2C output port.

The master ID register and the slave register each have the same internal address, but are accessible only from their own respective I2C buses (slave or master).

Other than an IM_xxx_ID registers (offset 0) and the I2C_Reset register, the I2C bus is arbitrated on an I2C cycle-by-cycle basis, using a first-come, first-served arbitration scheme.

For read cycles of the multi-byte registers, the ownership is held until the last byte is read. Software drivers insure that all bytes are fully read in the bottom to top sequence. If all bytes are not fully read in the bottom to top sequence, the bus may remain locked and the behavior may become undefined.

For accesses that are passed through the IM 1812 to external devices, the IM 1412 does not understand page addressing or any cycle that requires a dependency on any action in a prior access (cycles that extend for more than one I2C stop bit). Therefore a register bit (CONTROL_BITS_2: Bit 0: I2C_LOCK) is added. The software sets this register bit if a multi-I2C access is needed. When this register bit is set, the bus is given to that port specifically until the bit is unset, at which time the automatic arbitration resumes. In a case where both ports try to set this bit, then the standard arbitration method determines which gets access, and a negative acknowledgement (NACK) signal is sent to let the requester know it was unsuccessful.

A specific I2C_Reset register is used in a case of the I2C bus becoming locked for some unexpected reason. Any read to this register, regardless of I2C bus ownership, will always force the I2C state machines to reset and free up the I2C bus ownership, reverting back to the automatic arbitration.

For the other I2C registers, the I2C bus ownership is dynamically arbitrated for on a first-come, first-served fashion. The input port accessing the other registers first with a clock and start bit gets ownership for the duration of the current I2C cycle (that is, until the next stop bit). For multiple-byte read registers (counters) on the IM 1812, the ownership is maintained from the first byte read until the final byte of the register has been read.

If an I2C access starts after the bus has been granted to another input port, then a negative acknowledgement (NACK) signal is sent in response to the access attempt. The data for a read is undefined and writes are discarded.

The IM 1812 supports single non-page type I2C accesses for accesses off of the IM 1812. To allow for locking the I2C bus during multiple dependent type I2C cycles, if an input port sets an I2C_LOCK bit (I2C_CONTROL_2: bit 0) to 1, the I2C bus is held in that port's ownership until the same port sets the same bit back to 0. This register follows the same first-come, first-served arbitration protocol.

If the I2C_RESET register is read from either port (no arbitration or ownership is required), then the I2C state machine is reset and any I2C ownerships are cleared.

Figure 19:
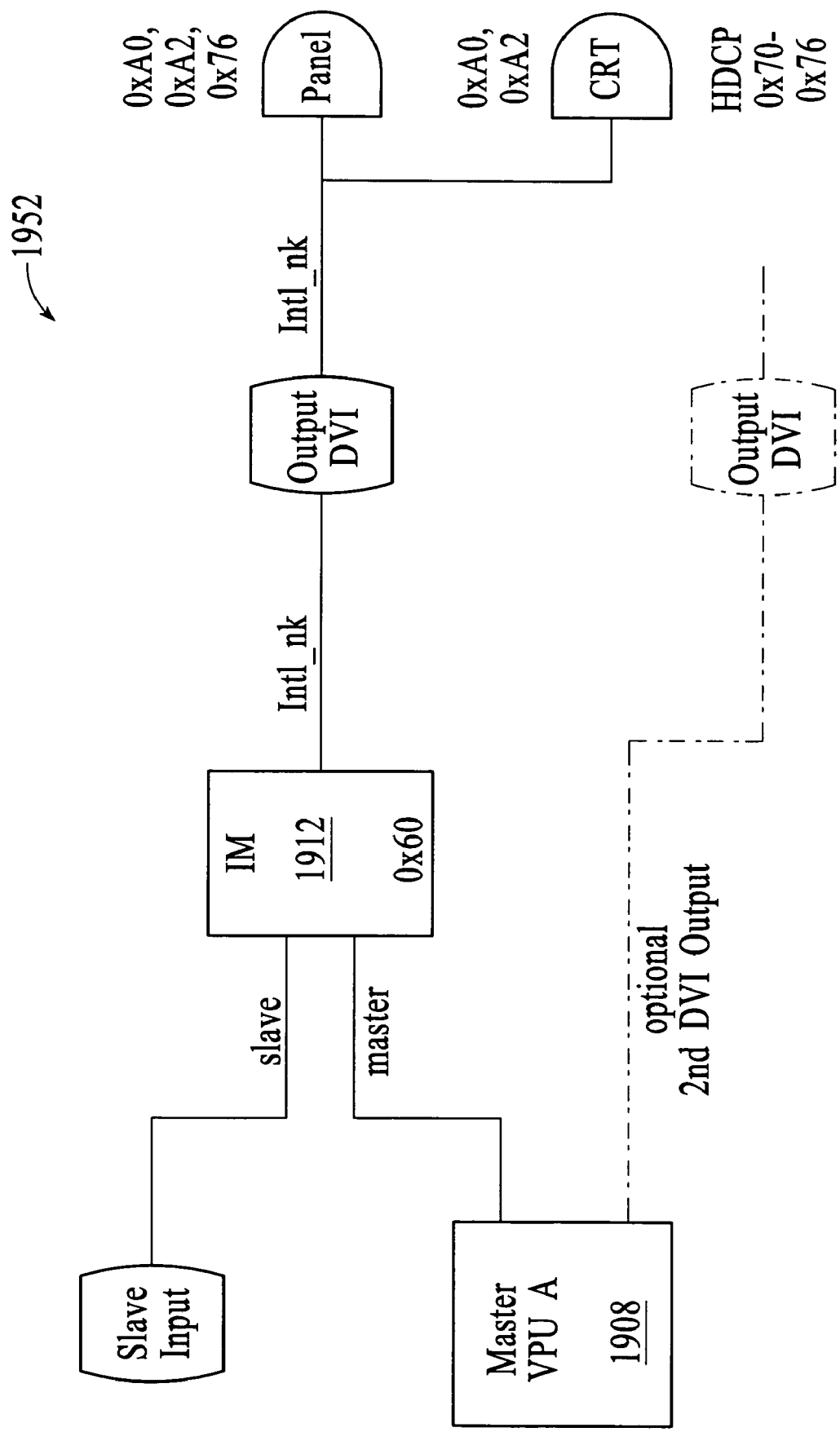
FIG. 19 is a block diagram of I2C paths on a VPU card according to an embodiment.

FIG. 19 is a diagram of I2C bus paths for a configuration in which a master VPU A and an IM 1912 are on the same VPU card 1952 according to an embodiment. The VPU card 1952 could be part of the system of FIG. 10, for example. The VPU card 1952 includes a master VPU 1908, an IM 1912, a DVI transmitter and optional DVI transmitter. There are three I2C buses (master, slave, and interlink), as shown entering and existing the IM 1912. In one embodiment, the interlink I2C bus is a continuation of the master I2C bus or slave I2C bus, depending on which bus is first accessed.

All IM 1912 I2C registers are available to either the slave or master I2C ports. Standard NACK responses are used if the I2C bus is currently in use by the other path. An IM 1912 device ID is an exception and can be accessed by either port at the same time.

In order to optionally verify that an I2C cycle has completed successfully, all write registers are readable back. Since the I2C registers on the IM 1912 do not time out, this matches the current method of I2C accesses used on various conventional video cards. The read back should not be necessary to verify writes.

The IM 1912 I2C resets its state machine (not shown) every time it gets a stop bit. This occurs at the start and end of every I2C cycle, according to known I2C protocol.

A CONTROL_ONESHOTS register (not shown) has a different behavior from the other read/write registers. Once written to, the IM 1912 latches its results to internal control bits. The CONTROL_ONESHOTS registers themselves are cleared on the next read of this register (allowing for confirmation of the write).

The internal copies of the CONTROL_ONESHOTS bits are automatically cleared by the IM 1912 once the IM 1912 has completed the requested function and the CONTROL_ONESHOTS register corresponding bits are cleared. The IM 1912 does not re-latch the internal versions until the I2C versions are manually cleared.

The IM 1912 has one set of registers which are I2C accessible. The IM_MASTER_ID and IM_SLAVE_ID registers have the same internal address but are accessible only from their own I2C bus (e.g., slave or master).

The rest of the registers are only accessible from one side (master or slave) at a time.

In order to verify that an I2C cycle has completed successfully, all write registers must also be readable back to verify the updated values. Since the I2C registers on the IM 1912 do not time out, this is consistent with conventional methods of I2C accesses used on various existing video cards. If needed, the read back should not be necessary to verify the writes.

The IM 1912 I2C also resets its state machine every time it gets a stop bit. This happens as per I2C protocol at the start and end of every I2C cycle.

The CONTROL_ONESHOTS register has a different behavior from the other read/write registers. Once written to, the IM latches its results to internal control bits. The CONTROL_ONESHOTS are cleared on the next read of this register (allowing for confirmation of the write).

The internal copies of the CONTROL_ONESHOTS bits are automatically cleared by the IM once the IM has completed the requested function and the CONTROL_ONESHOTS register corresponding bits are cleared.

In a dongle configuration, such as in FIGS. 12 and 13, for example, the TMDS control bits are transmitted through the TMDS interface into the IM. The software (driver) sets the registers within the VPU for the desired control bit values and the results arrive at the TMDS receivers on the dongle and are latched into the IM 1912. The AFR_MAN_ON* and AFR_AUTO* are latched on the rising edge of the TMDS VSync. No pixel data is being transmitted at this time. AFR_MAS is latched in on the rising edge of either HSync or VSync, depending on the setting in the I2C Control_Bits register, bit 5.

If the interlink_mode is not enabled (I2C register set), then the bits will be ignored until it is enabled and will take place on the next VSync.

If the interlink_mode is enabled, then the affect occurs on the very next pixel data coming out of the IMs after the VSync or HSync as is appropriate.

If in pass-through modes, the Syncs used are from the active path. If in AFR_MANual or blacking interlink modes, then the Syncs used are always from the master path.

Aspects of the invention described above may be implemented as functionality programmed into any of a variety of circuitry, including but not limited to programmable logic devices (PLDs), such as field programmable gate arrays (FPGAs), programmable array logic (PAL) devices, electrically programmable logic and memory devices and standard cell-based devices, as well as application specific integrated circuits (ASICs) and fully custom integrated circuits. Some other possibilities for implementing aspects of the invention include: microcontrollers with memory (such as electronically erasable programmable read only memory (EEPROM)), embedded microprocessors, firmware, software, etc. Furthermore, aspects of the invention may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize. The teachings of the invention provided herein can be applied to other systems, not only for the system including graphics processing or video processing as described above.

For example, a video image produced as described herein may be output to a variety of display devices, including computer displays that display moving pictures and printers that print static images.

The various operations described may be performed in a very wide variety of architectures and distributed differently than described. As an example, in a distributed system a server may perform some or all of the rendering process. In addition, though many configurations are described herein, none are intended to be limiting or exclusive. For example, the invention can also be embodied in a system that includes an integrated graphics processor (IGP) or video processor and a discrete graphics or video processor that cooperate to produce a frame to be displayed. In various embodiments, frame data processed by each of the integrated and discrete processors is merged or composited as described. Further, the invention can also be embodied in a system that includes the combination of one or more IGP devices with one or more discrete graphics or video processors.

In other embodiments not shown, the number of VPUs can be more than two.

In other embodiments, some or all of the hardware and software capability described herein may exist in a printer, a camera, television, handheld device, mobile telephone or some other device. The video processing techniques described herein may be applied as part of a process of constructing animation from a video sequence.

The elements and acts of the various embodiments described above can be combined to provide further embodiments. These and other changes can be made to the invention in light of the above detailed description.

All of the U.S. Patent Applications cited herein are hereby incorporated by reference in their entirety.

In general, in the following claims, the terms used should not be construed to limit the video processing method and system to the specific embodiments disclosed in the specification and the claims, but should be construed to include any processing systems that operate under the claims to provide video processing. Accordingly, the video processing method and system is not limited by the disclosure, but instead the scope of the video processing method and system is to be determined entirely by the claims.

While certain aspects of the method and apparatus for video processing are presented below in certain claim forms, the inventors contemplate the various aspects of the method and apparatus for video processing in any number of claim forms. For example, while only one aspect of the method and apparatus for video processing may be recited as embodied in computer-readable medium, other aspects may likewise be embodied in computer-readable medium. Computer-readable media include any data storage object readable by a computer including various types of compact disc: (CD-ROM), write-once audio and data storage (CD-R), rewritable media (CD-RW), DVD (Digital Versatile Disc "or " Digital Video Disc), as well as any type of known computer memory device. Accordingly, the inventors reserve the right to add additional claims after filing the application to pursue such additional claim forms for other aspects of the method and apparatus for video processing

What is claimed is:

1. A multiple processor system, comprising:
a plurality of special purpose processors that perform a single task under common control of a central processing unit, each of the special purpose processors comprising,
a respective local memory accessible using local memory addresses;
a virtual memory mechanism for accessing shared memory, wherein the shared memory is external to the respective local memories, the virtual memory mechanism comprising a mapping table for mapping virtual addresses to physical addresses of the shared memory; and
an area in the mapping table for mapping virtual addresses to local addresses of other special purpose processors in the system, so as to enable each of the special purpose processors to access respective local memories of other special purpose processors.

2. A method for video processing, comprising:
sharing a rendering task among a plurality of video processing units (VPUs); and
mapping local memories of each of the VPUs to respective local address translation tables of all of the other VPUs such that each of the VPUs may access respective local memories of any of the other VPUs via each of the VPUs' own respective virtual addressing schemes.

3. The method of claim 2, wherein local memories of each of the other VPUs is mapped to a GART table of each of the VPUs.

4. The method of claim 3, wherein each of the VPUs uses a same virtual address for the mapping to local memories of each of the other VPUs.

5. The method of claim 2, wherein sharing the rendering task comprises a driver transmitting identical commands to each of the VPUs, including a numeric value of a destination address for rendering operations.

6. The method of claim 5, wherein the numerical value comprises a virtual address that is transmitted to the each of the VPUs and is interpreted differently by each of the VPUs.

7. The method of claim 2, wherein local memories of respective VPUs include frame buffers and registers.

8. The method of claim 2, wherein mapping comprises mapping a physical address space of each of the respective VPUs to include a frame buffer area for each of the other VPUs, wherein addresses in the frame buffer area for each of the other VPUs point to a bus physical address space through which frame buffers of each of the other VPUs is accessible.

9. The method of claim 8, wherein the physical address space of at least one of the respective VPUs comprises system memory, and wherein a frame buffer area of the at least one VPU is in a BIOS range of bus physical address space.

10. The method of claim 2, wherein mapping comprises mapping a physical address space of each of the respective VPUs to include a memory mapped register (MMR) area for each of the other VPUs, wherein addresses in the MMR area for each of the other VPUs point to a bus physical address space through which memory mapped registers of each of the other VPUs is accessible.

11. The method of claim 10, wherein frame buffer areas of each of the respective VPUs are aligned on identical address boundaries.

12. The method of claim 10, wherein MMR areas for each of the respective VPUs are aligned on identical address boundaries.

13. A multiple processor system, comprising:
a plurality of processors configurable to share tasks, wherein each processor comprises a local memory;
a system bus configurable to transmit data among the processors; and
a system memory coupled to the system bus, wherein each of the processors is configurable to virtually access the system memory and local memories of each other processor via the system bus.

14. The system of claim 13, wherein the plurality of processors comprise a plurality of video processing units (VPUs), and wherein the local memory of each of the VPUs comprises an area that stores address mapping information according to a virtual addressing scheme, and wherein the virtual addressing scheme comprises mapping non-local memory, including system memory and local memories of each other processor, to the local memory via a bus physical address space.

15. The system of claim 14, wherein the area that stores address mapping information comprises a frame buffer area for mapping frame buffers of each other processor, and a memory mapped register (MMR) area for mapping MMRs of each other processor.

16. The system of claim 13 wherein the plurality of processors comprise at least one video processing unit (VPU) including at least one integrated VPU and at least one discrete VPU.

17. The system of claim 13 wherein each of the processors comprises a physical memory that includes an area for storing address translations, including frame buffer areas for storing translations of addresses of local frame buffers that are located in local memories of other VPUs.

18. The system of claim 17 wherein frame buffer areas of each of the VPUs are aligned on identical address boundaries.

19. The system of claim 13, wherein each of the processors comprises a physical memory that includes an area for storing address translations, including memory mapped register (MMR) areas for storing translations of addresses of MMRs that are located in local memories of other VPUs.

20. The system of claim 19, wherein MMR areas of each of the VPUs are aligned on identical address boundaries.

21. The system of claim 13, wherein the plurality of processor comprise multiple video processing units (VPUs) configurable to share a rendering task, and wherein the system further comprises a driver configurable to transmit identical commands to each of the VPUs, including a numeric value of a destination address for rendering task.

22. The method of claim 21, wherein the numerical value comprises a virtual address that is transmitted to the each of the VPUs and is interpreted differently by each of the VPUs.

23. A computer-readable medium that stores instructions which, when executed in a video processing system cause the video processing system to:
- share a rendering task among a plurality of video processing units (VPUs); and
- map local memories of each of the VPUs to respective local address translation tables of all of the other VPUs such that each of the VPUs may access respective local memories of any of the other VPUs via cach of the VPUs' own respective virtual addressing schemes.

24. The medium of claim 23, wherein local memories of each of the other VPUs is mapped to a GART table of each of the VPUs.

25. The medium of claim 24 wherein each of the VPUs uses a same virtual address for the mapping to local memories of each of the other VPUs.

26. The medium of claim 23, wherein sharing the rendering task comprises a driver transmitting identical write commands to each of the VPUs, including a numeric value of a destination address for rendering operations.

27. The medium of claim 26, wherein the numerical value comprises a virtual address that is transmitted to the each of the VPUs and is interpreted differently by each of the VPUs.

28. The medium of claim 23, wherein local memories of respective VPUs include frame buffers and registers.

29. The medium of claim 23, wherein mapping comprises mapping a physical address space of each of the respective VPUs to include a frame buffer area for each of the other VPUs, wherein addresses in the frame buffer area for each of the other VPUs point to a bus physical address space through which frame buffers of each of the other VPUs is accessible.

30. The medium of claim 29, wherein the physical address space of at least one of the respective VPUs comprises system memory, and wherein a frame buffer area of the at least one VPU is in a BIOS range of bus physical address space.

31. The medium of claim 30, wherein MMR areas for each of the respective VPUs are aligned on identical address boundaries.

32. The medium of claim 23, wherein mapping comprises mapping a physical address space of each of the respective VPUs to include a memory mapped register (MMR) area for each of the other VPUs, wherein addresses in the MMR area for each of the other VPUs point to a bus physical address space through which memory mapped registers of each of the other VPUs is accessible.

33. The medium of claim 32 wherein frame buffer areas of each of the respective VPUs are aligned on identical address boundaries.

* * * * *